(12) United States Patent
Ehara

(10) Patent No.: US 9,560,327 B2
(45) Date of Patent: Jan. 31, 2017

(54) PROJECTION SYSTEM AND PROJECTION METHOD

(71) Applicant: Mikinori Ehara, Kanagawa (JP)

(72) Inventor: Mikinori Ehara, Kanagawa (JP)

(73) Assignee: RICOH COMPANY, LIMITED, Tokyo (JP)

(*) Notice: Subject to any disclaimer, the term of this patent is extended or adjusted under 35 U.S.C. 154(b) by 74 days.

(21) Appl. No.: 14/623,208

(22) Filed: Feb. 16, 2015

(65) Prior Publication Data

US 2015/0237317 A1    Aug. 20, 2015

(30) Foreign Application Priority Data

Feb. 19, 2014  (JP) .................................. 2014-029955
Jun. 12, 2014  (JP) .................................. 2014-121734

(51) Int. Cl.
*G03B 21/14* (2006.01)
*H04N 9/31* (2006.01)
*G09G 5/377* (2006.01)
*G06F 3/042* (2006.01)
*G06F 3/041* (2006.01)
*H04N 5/232* (2006.01)

(52) U.S. Cl.
CPC ............ *H04N 9/3185* (2013.01); *G03B 21/14* (2013.01); *G06F 3/0418* (2013.01); *G06F 3/0425* (2013.01); *G09G 5/377* (2013.01); *H04N 5/23238* (2013.01); *H04N 9/3147* (2013.01); *H04N 9/3194* (2013.01)

(58) Field of Classification Search
CPC .............. H04N 5/74; H04N 9/31; H04N 5/22; H04N 5/23; G03B 21/14; G06T 5/00; G09G 5/37
See application file for complete search history.

(56) References Cited

U.S. PATENT DOCUMENTS

2006/0181685 A1*  8/2006  Hasegawa .............. G03B 37/04
                                                            353/69
2013/0222386 A1*  8/2013  Tannhauser ........... G06T 3/4038
                                                            345/428
2014/0204204 A1    7/2014  Sumiyoshi et al.

FOREIGN PATENT DOCUMENTS

JP         2004274283 A      9/2004
JP         2006-349791       12/2006
(Continued)

*Primary Examiner* — Sultan Chowdhury
*Assistant Examiner* — Danell L Owens
(74) *Attorney, Agent, or Firm* — Harness, Dickey & Pierce, P.L.C.

(57) ABSTRACT

A projection system includes an image capturing unit which, when a first pattern image is projected on a first projection area, captures an image capture area including the first projection area and at least a portion of a second projection area which overlaps the first projection area to obtain a first captured image and, when a second pattern image is projected on the second projection area, captures the image capture area to obtain a second captured image, a first projection unit which projects a first partial projection-target image extracted from a projection target image based on the first and second captured images and the projection target image on the first projection area, and a second projection unit which projects a second partial projection-target image extracted from the projection target image based on the first and second captured images and the projection target image on the second projection area.

17 Claims, 19 Drawing Sheets

(56) References Cited

FOREIGN PATENT DOCUMENTS

| JP | 2009-223231 | 10/2009 |
| JP | 2013-042411 | 2/2013 |

* cited by examiner

L61

L71

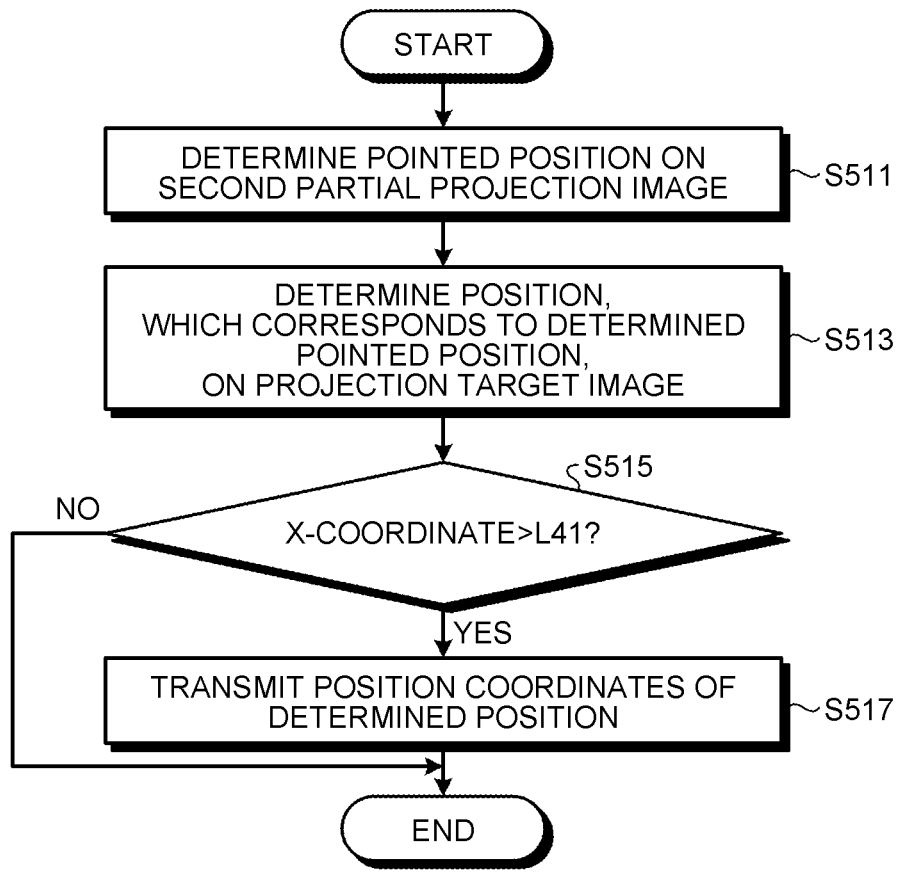
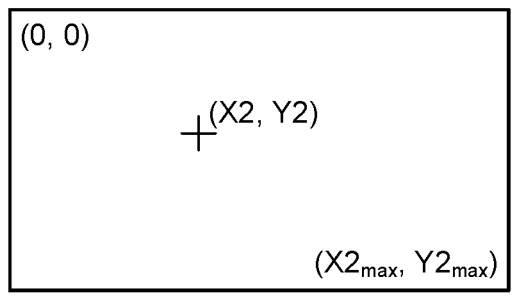

PROJECTION SYSTEM AND PROJECTION METHOD

CROSS-REFERENCE TO RELATED APPLICATIONS

The present application claims priority to and incorporates by reference the entire contents of Japanese Patent Application No. 2014-029955 filed in Japan on Feb. 19, 2014 and Japanese Patent Application No. 2014-121734 filed in Japan on Jun. 12, 2014.

BACKGROUND OF THE INVENTION

1. Field of the Invention

The present invention relates generally to a projection system and a projection method.

2. Description of the Related Art

Some type of known projection systems, such as a multiple projection system, is configured to use multiple projection apparatuses such as projectors in projecting multiple partial projection-target images which make up a projection target image on a projection medium such as a screen, thereby forming an image of high brightness and high resolution. An example of such a multiple projection system is disclosed in Japanese Laid-open Patent Publication No. 2006-349791.

Such a projection system typically determines partial projection-target images to be projected by projection apparatuses using a captured image where a projection medium and pattern images projected by the projection apparatuses are captured, and therefore requires that an image capture device be arranged or a wide-angle lens be used so that such captured images can be obtained.

However, it is necessary to arrange the image capture device at a certain distance or further away from the projection medium so that such a captured image as that described above can be captured. As a result, a rather severe constraint is imposed on arrangement, which can make such a projection system inapplicable depending on an environment where the system is used. Employing a wide-angle lens to obtain such a captured image as that described above will undesirably increase cost.

Under the circumstances, there is a need for a projection system and a projection method which allow reducing cost and constraint on arrangement.

It is an object of the present invention to at least partially solve the problem in the conventional technology.

SUMMARY OF THE INVENTION

It is an object of the present invention to at least partially solve the problems in the conventional technology.

According to the present invention, there is provided a projection system including multiple projection apparatuses, the projection system comprising: a first projection unit configured to project a first pattern image on a first projection area; a second projection unit configured to project a second pattern image on a second projection area, the second projection area partially overlapping the first projection area; and a first image capturing unit configured to, when the first pattern image is projected on the first projection area, perform first image capture to obtain a first captured image by capturing an image capture area including the first projection area and at least a portion of a second projection area and, when the second pattern image is projected on the second projection area, perform second image capture to obtain a second captured image by capturing the image capture area, wherein the first projection unit projects a first partial projection-target image extracted from a projection target image based on the first captured image, the second captured image, and the projection target image on the first projection area, and the second projection unit projects a second partial projection-target image extracted from the projection target image based on the first captured image, the second captured image, and the projection target image on the second projection area.

The present invention also provides a projection method comprising: projecting a first pattern image on a first projection area; performing, when the first pattern image is projected on the first projection area, first image capture to obtain a first captured image by capturing an image capture area including the first projection area and at least a portion of a second projection area, the second projection area partially overlapping the first projection area; projecting a second pattern image on the second projection area; performing, when the second pattern image is projected on the second projection area, second image capture to obtain a second captured image by capturing the image capture area; projecting a first partial projection-target image extracted from a projection target image based on the first captured image and the second captured image on the first projection area; and projecting a second partial projection-target image extracted from the projection target image based on the first captured image and the second captured image on the second projection area.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 25 is a flowchart illustrating a detailed example of the operation at Steps S405 and S407 of FIG. 21;

FIG. 26 is an explanatory diagram of an example of coordinates of a second partial projection-target image;

DETAILED DESCRIPTION OF THE PREFERRED EMBODIMENTS

Exemplary embodiments of the present invention are described in detail below with reference to the accompanying drawings.

First Embodiment

Figure 1:
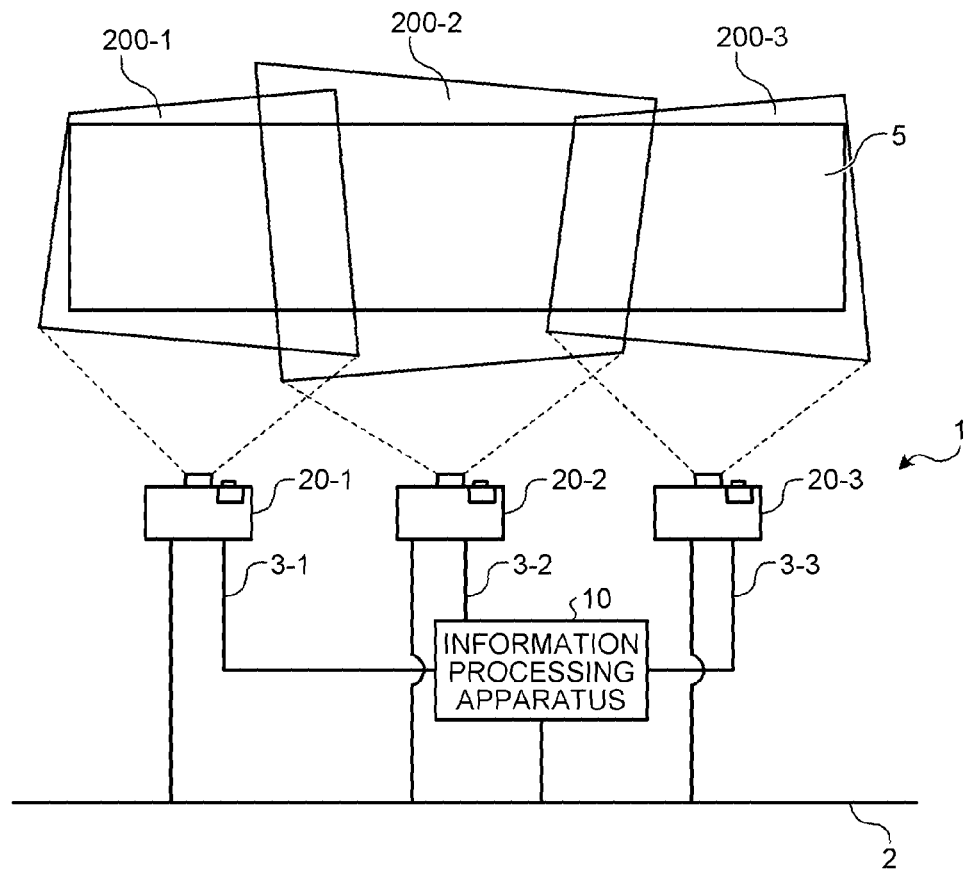
FIG. 1 is a block diagram illustrating an example configuration of a projection system according to a first embodiment of the present invention.

FIG. 1 is a block diagram illustrating an example configuration of a projection system 1 according to a first embodiment of the present invention. As illustrated in FIG. 1, the projection system 1 includes an information processing apparatus 10 and projection apparatuses 20-1 to 20-3. Hereinafter, each of the projection apparatuses 20-1 to 20-3 may be simply referred to as the projection apparatus 20 insofar as it is not necessary to differentiate therebetween.

The projection apparatuses 20-1 to 20-3 are connected to the information processing apparatus 10 via video cables 3-1 to 3-3, respectively. The video cables 3-1 to 3-3 may be embodied as, for example, HDMI (registered trademark) (high-definition multimedia interface) cables or DVI (digital visual interface) cables.

The information processing apparatus 10, the projection apparatus 20-1, the projection apparatus 20-2, and the projection apparatus 20-3 are connected to each other over a communication net 2. The communication net 2 may be embodied as, for example, a network such as a LAN (local area network) or the Internet, or may be a serial cable or the like. The LAN may be either a wired LAN or a wireless LAN.

The projection apparatuses 20-1 to 20-3 project images on projection areas (projection surfaces) 200-1 to 200-3, respectively, thereby forming a picture on a projection medium 5 which may be a screen, for example. The projection areas 200-1 to 200-3 and the projection medium 5 are on a same plane.

The projection areas 200-1 to 200-3 are projection areas of the projection apparatuses 20-1 to 20-3 in their initial states, respectively, and are adjustable. For this reason, the projection areas 200-1 to 200-3 may vary from each other in shape and size as illustrated in FIG. 1. Because the need of orienting the projection apparatuses 20-1 to 20-3 exactly toward the projection medium 5 and arranging the projection apparatuses 20-1 to 20-3 equidistant from the projection medium 5 is eliminated, cost related to manpower for arranging the projection apparatuses 20-1 to 20-3 can be reduced. Meanwhile, unless a projection area is exactly facing the projection apparatus 20, the projection area is distorted trapezoidally in such a manner that the width or height of the projection area varies depending on the distance from the projection apparatus 20.

Noted that it is necessary to arrange the projection apparatuses 20-1 to 20-3 so that adjacent projection areas partially overlap each other as illustrated in FIG. 1. More specifically, it is necessary to arrange the projection apparatuses 20-1 and 20-2 so that the projection area 200-1 partially overlaps the projection area 200-2 and arrange the projection apparatuses 20-2 and 20-3 so that the projection area 200-2 partially overlaps the projection area 200-3.

The first embodiment will be described below by way of example in which each of the three laterally-aligned projection apparatuses 20 projects an image on the projection medium 5, thereby displaying the images on the projection medium 5 in a tiled manner as illustrated in FIG. 1. However, the configuration is not limited thereto. For example, the number of the projection apparatuses 20 may be any number not less than two.

The information processing apparatus 10 can be embodied by a computer capable of distributing video signals. Examples of such a computer include a PC (personal computer), a server apparatus, a tablet terminal, and a smartphone.

Figure 2:
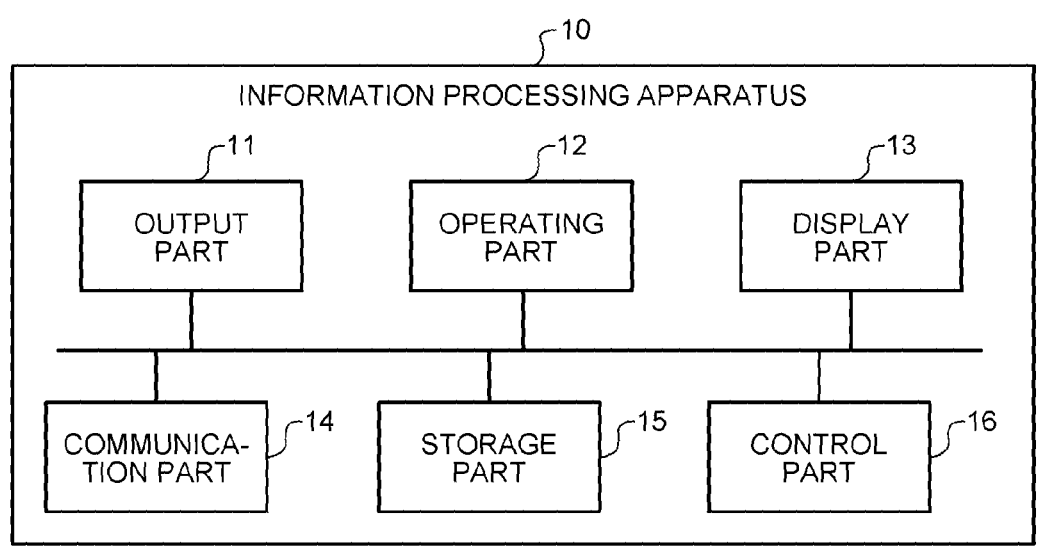
FIG. 2 is a block diagram illustrating an example configuration of an information processing apparatus according to the first embodiment.

FIG. 2 is a block diagram illustrating an example configuration of the information processing apparatus 10 according to the first embodiment. As illustrated in FIG. 2, the information processing apparatus 10 includes an output part 11, an operating part 12, a display part 13, a communication part 14, a storage part 15, and a control part 16.

The output part 11 is configured to output video signals representing a projection target image and the like to the projection apparatuses 20-1 to 20-3 via the video cables 3-1 to 3-3. The output part 11 may be embodied as a video signal distributer, for example. Examples of the video signal include an HDMI signal and an RGB signal.

The operating part 12 is configured to receive inputs of various operations. The operating part 12 may be embodied as an input device such as a keyboard, a mouse, a touch pad, or a touch panel.

The display part 13 is configured to display various pictures. The display part 13 may be embodied as a display device such as a liquid crystal display or a touch panel display.

The communication part 14 is configured to carry out communications with the projection apparatuses 20-1 to 20-3 via the communication net 2. For example, if the communication net 2 is a network, the communication part 14 may be embodied as a communication device such as an NIC (network interface card).

The storage part 15 stores various programs to be executed by the information processing apparatus 10, data for use in various processing executed by the information processing apparatus 10, and the like. The storage part 15 may be embodied as at least any one of a magnetic storage device, an optical storage device, and an electric storage device, such as an HDD (hard disk drive), an SSD (solid state drive), a memory card, an optical disk, a RAM (random access memory), and a ROM (read only memory).

The control part 16 is configured to control various units of the information processing apparatus 10. The control part 16 may be embodied as a control device such as a CPU (central processing unit). The control part 16 is an example of the calculation unit described in Claims.

The projection apparatus 20 is configured to project an image. The projection apparatus 20 may be embodied as, for example, a projector.

Figure 3:
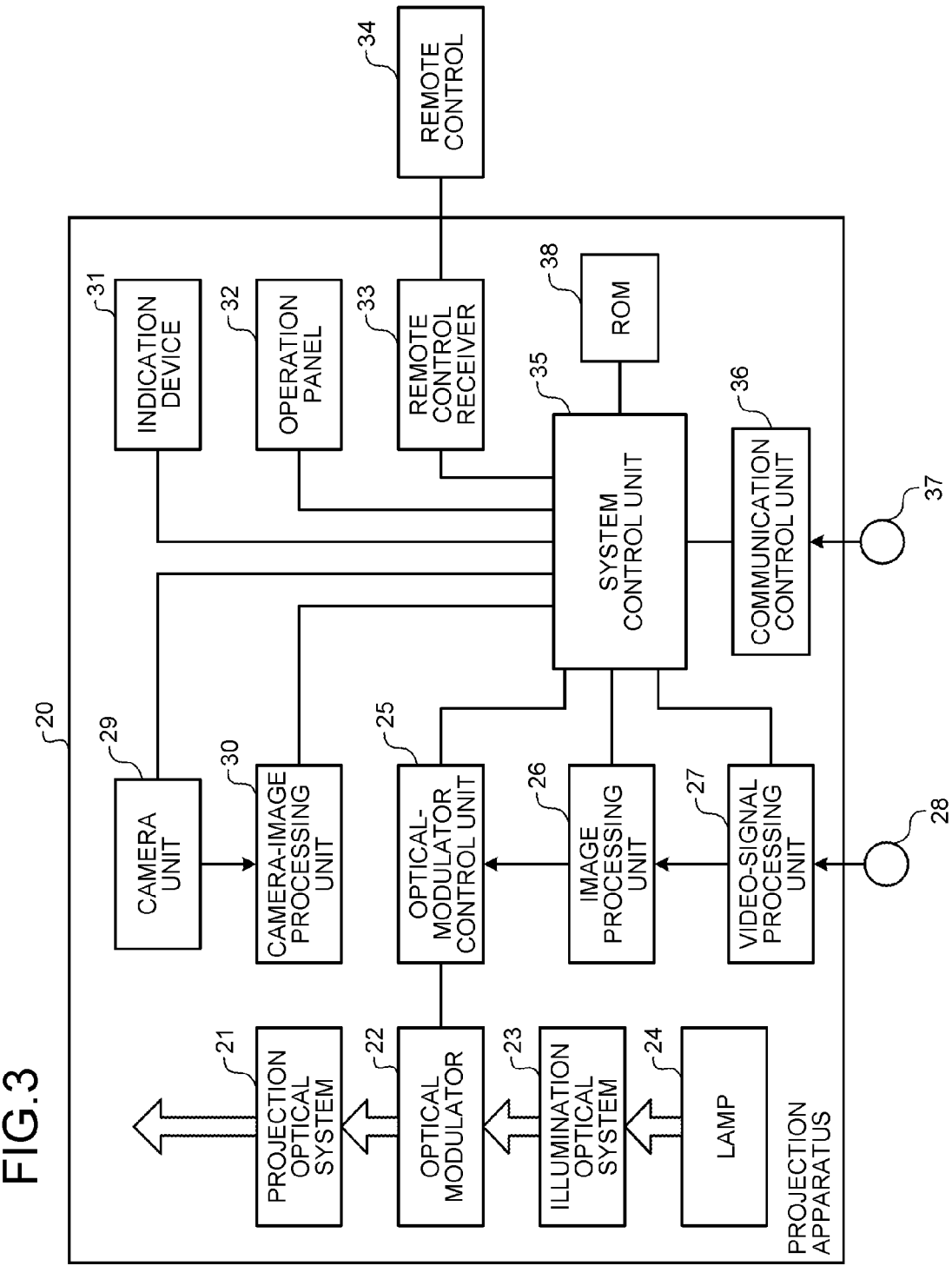
FIG. 3 is a block diagram illustrating an example configuration of a projection apparatus according to the first embodiment.

FIG. 3 is a block diagram illustrating an example configuration of the projection apparatus 20 according to the first embodiment. As illustrated in FIG. 3, the projection apparatus 20 includes a projection optical system 21, an optical modulator 22, an illumination optical system 23, a lamp 24, an optical-modulator control unit 25, an image processing unit 26, a video-signal processing unit 27, a video connector terminal (hereinafter, "video terminal") 28, a camera unit 29, a camera-image processing unit 30, an indication device 31, an operation panel 32, a remote control receiver 33, a system control unit 35, a communication control unit 36, a communication connector terminal (hereinafter, "communication terminal") 37, and a ROM 38.

The video-signal processing unit 27 processes the video signal fed from the information processing apparatus 10 via the video terminal 28.

The image processing unit 26 performs various image processing on the video signal processed by the video-signal processing unit 27.

The optical-modulator control unit 25 causes the optical modulator 22 to display an image represented by the video signal having undergone the various image processing performed by the image processing unit 26.

Any lamp configured to emit light can be used as the lamp 24 which functions as a light source.

The illumination optical system 23 concentrates the light emitted from the lamp 24 on the optical modulator 22. The illumination optical system 23 may be embodied as, for example, a lens(lenses) and a mirror(mirrors).

The optical modulator 22 which displays an image fed from the optical-modulator control unit 25 reflects the light concentrated by the illumination optical system 23 or causes the light to pass through. The optical modulator 22 may be embodied as, for example, a DMD (digital mirror device) or a liquid crystal panel.

The projection optical system 21 projects the light reflected from or passed through the optical modulator 22 on the projection medium 5, thereby projecting (forming) an image on the projection medium 5. The projection optical system 21 may be embodied as a lens(lenses) and a mirror (mirrors).

The system control unit 35 which controls various units of the projection apparatus 20 may be embodied as a processing device including a CPU, a RAM, and the like. The system control unit 35 also receives a notification from the operation panel 32 or the remote control receiver 33 and performs processing in accordance with the notification.

The ROM 38, which is connected to the system control unit 35, stores variety of information for use by the system control unit 35. The variety of information is read out by the system control unit 35 from the ROM 38 as necessary.

The indication device 31 which indicates a status of the projection apparatus 20 may be embodied as, for example, an LED (light emitting diode). The indication device 31 may be configured to, for example, upon receiving a notification from the system control unit 35 which detects occurrence of an error, provide indication thereof (by lighting up or blinking the LED, for example).

The operation panel 32 notifies the system control unit 35 of an operation input entered by a user. The operation panel 32 may be embodied as, for example, a touch panel.

A remote control 34 notifies the remote control receiver 33 of various operations input entered by a user. The remote control receiver 33 notifies the system control unit 35 of the various operations notified from the remote control 34.

The camera unit 29 captures an image projected by the projection optical system 21 on the projection medium 5. The camera unit 29 may be embodied as, for example, a camera. Note that an image capture area of the camera unit 29 is adjusted to encompass a corresponding one of projection areas of the projection optical system 21. More specifically, the image capture area of the camera unit 29 of the projection apparatus 20-1 encompasses the projection area 200-1. The image capture area of the camera unit 29 of the projection apparatus 20-2 encompasses the projection area 200-2. The image capture area of the camera unit 29 of the projection apparatus 20-3 encompasses the projection area 200-3.

The camera-image processing unit 30 performs analysis of a captured image captured by the camera unit 29, various image processing on the captured image, and the like.

The communication control unit 36 controls communications between the information processing apparatus 10 and the other projection apparatuses 20 via the communication terminal 37.

The projection optical system 21 of the projection apparatus 20-1 is an example of the first projection unit described in Claims. The camera unit 29 of the projection apparatus 20-1 is an example of the first image capturing unit described in Claims. The camera-image processing unit 30 of the projection apparatus 20-1 is an example of the image-length-information determining unit and the image-capture-distortion correcting unit described in Claims. The system control unit 35 of the projection apparatus 20-1 is an example of the first generation unit described in Claims. The image processing unit 26 of the projection apparatus 20-1 is an example of the first extraction unit and the first projection-distortion correcting unit described in Claims. The projection optical system 21 of the projection apparatus 20-2 is an example of the second projection unit described in Claims. The system control unit 35 of the projection apparatus 20-2 is an example of the second generation unit described in Claims. The image processing unit 26 of the projection apparatus 20-2 is an example of the second extraction unit and the second projection-distortion correcting unit described in Claims.

Specific operations of the information processing apparatus 10 and the projection apparatuses 20 are described below.

Figure 4:
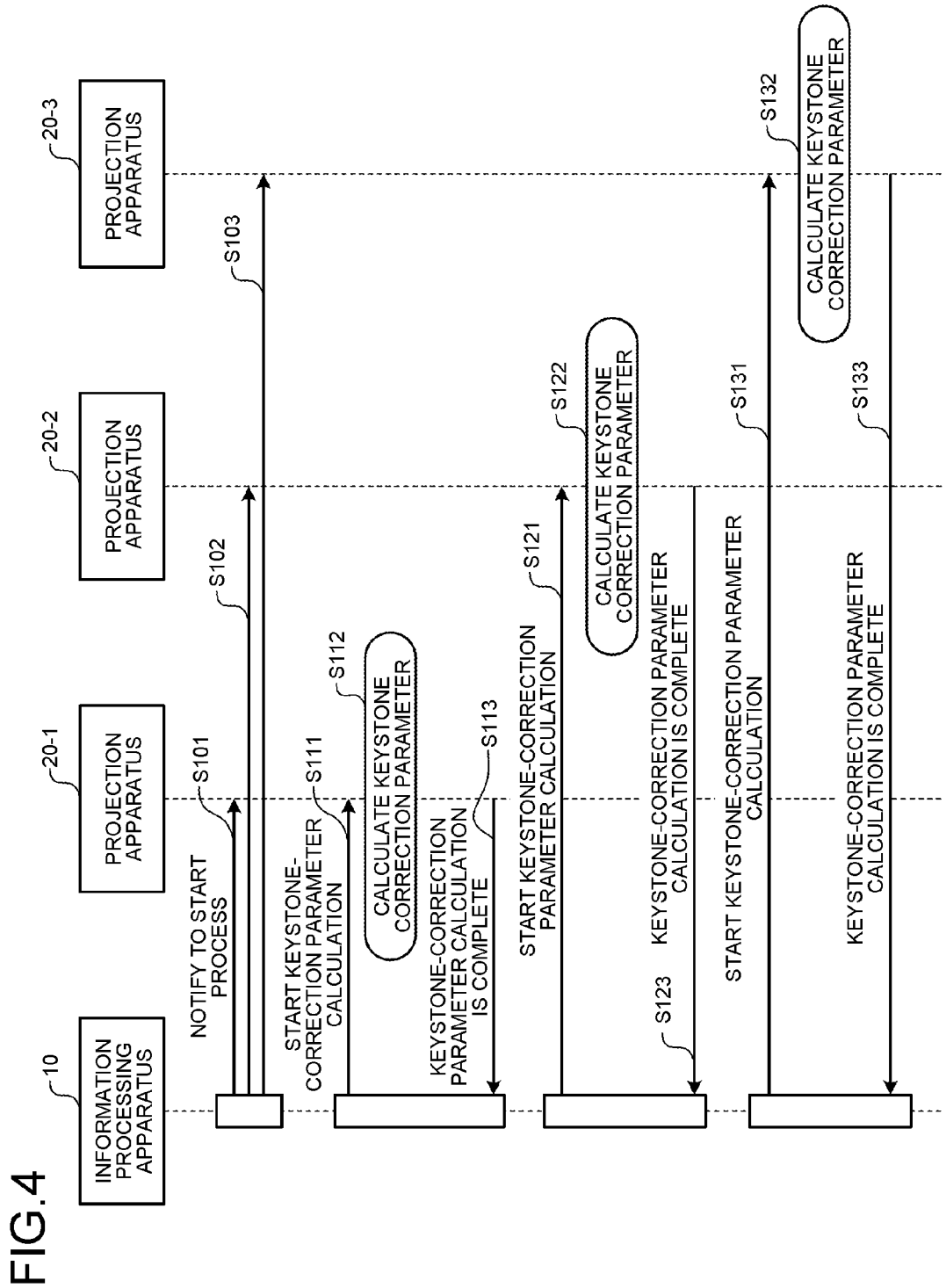
FIG. 4 is a sequence diagram illustrating an example of a keystone-correction-parameter calculation process performed in the projection system according to the first embodiment.

FIG. 4 is a sequence diagram illustrating an example of a keystone-correction-parameter calculation process (an example of the projection distortion correction) performed in the projection system 1 according to the first embodiment.

The control part 16 of the information processing apparatus 10 notifies the projection apparatuses 20-1 to 20-3 to start the process. Upon being notified to start the process via the communication control unit 36, the system control unit 35 of each of the projection apparatuses 20 causes operations of the units of the projection apparatus 20 and operations of the system control unit 35 to be stopped (Steps S101 to S103). Each of the projection apparatuses 20-1 to 20-3 thus stops ongoing operations and enters a state waiting for a command to start keystone-correction parameter calculation.

Thereafter, the control part 16 of the information processing apparatus 10 sends a command to start keystone-correction parameter calculation to the projection apparatus 20-1 (Step S111).

Upon receiving the command to start keystone-correction parameter calculation via the communication control unit 36, the system control unit 35 of the projection apparatus 20-1 causes the keystone correction parameter to be calculated (Step S112).

Calculation of the keystone correction parameter is specifically described below.

First, upon receiving a command from the system control unit 35 of the projection apparatus 20-1, the camera unit 29 of the projection apparatus 20-1 performs image capture in the image capture area of the camera unit 29, thereby generating a projection-medium captured image where a portion of the projection medium 5 is captured.

Thereafter, the camera-image processing unit 30 of the projection apparatus 20-1 determines a region where the portion of the projection medium 5 is captured in the projection-medium captured image by analyzing contrasts in the projection-medium captured image.

Thereafter, upon receiving a command from the system control unit 35 of the projection apparatus 20-1, the image processing unit 26 of the projection apparatus 20-1 generates a pattern image; the optical-modulator control unit 25 of the projection apparatus 20-1 causes the optical modulator 22 of the projection apparatus 20-1 to display the pattern image; the projection optical system 21 of the projection apparatus 20-1 projects the pattern image. Thus, the pattern image is projected on the projection area 200-1.

Thereafter, upon receiving a command from the system control unit 35 of the projection apparatus 20-1, the camera unit 29 of the projection apparatus 20-1 performs image capture in the image capture area of the camera unit 29, thereby generating a pattern captured image where the pattern image is captured.

Thereafter, the camera-image processing unit 30 of the projection apparatus 20-1 determines a region where the pattern image is captured in the pattern captured image, thereby determining a region of the projection area 200-1.

Thereafter, the camera-image processing unit 30 of the projection apparatus 20-1 calculates a keystone correction parameter from the region determined as the portion of the projection medium 5 and the region determined as the projection area 200-1. The keystone correction parameter is used to tailor the projection area 200-1 to the portion of the projection medium 5. Technique for calculating such a keystone correction parameter is known. An example of the technique is disclosed in Japanese Laid-open Patent Application No. 2004-274283.

However, a method for calculating the keystone correction parameter is not limited to the technique. For example, the keystone correction parameter may be determined by a user by repeating manual input of a keystone correction parameter until it is determined that a result of keystone correction with the manually-input keystone correction parameter is acceptable. Further alternatively, a keystone correction parameter which maximizes a size of keystone-corrected projection areas may be calculated using a size of an adjacent projection area.

Thereafter, the camera-image processing unit 30 of the projection apparatus 20-1 transmits the calculated keystone correction parameter to the system control unit 35 of the projection apparatus 20-1. The system control unit 35 stores the keystone correction parameter in the ROM 38 of the projection apparatus 20-1.

Calculation of the keystone correction parameter has been specifically described above.

Thereafter, the system control unit 35 of the projection apparatus 20-1 notifies the information processing apparatus 10 that the keystone-correction parameter calculation is complete via the communication control unit 36 (Step S113).

The information processing apparatus 10 and the projection apparatus 20-2 perform an operation similar to that from Step S111 to Step S113 as an operation from Step S121 to Step S123. The information processing apparatus 10 and the projection apparatus 20-3 perform an operation similar to that from Step S111 to Step S113 as an operation from Step S131 to Step S133.

Note that it is not requisite to perform the operation from Step S111 to Step S113, the operation from Step S121 to Step S123, and thereafter the operation from Step S131 to Step S133 in this order. The sequence of these operations can be arranged differently.

Figure 5:
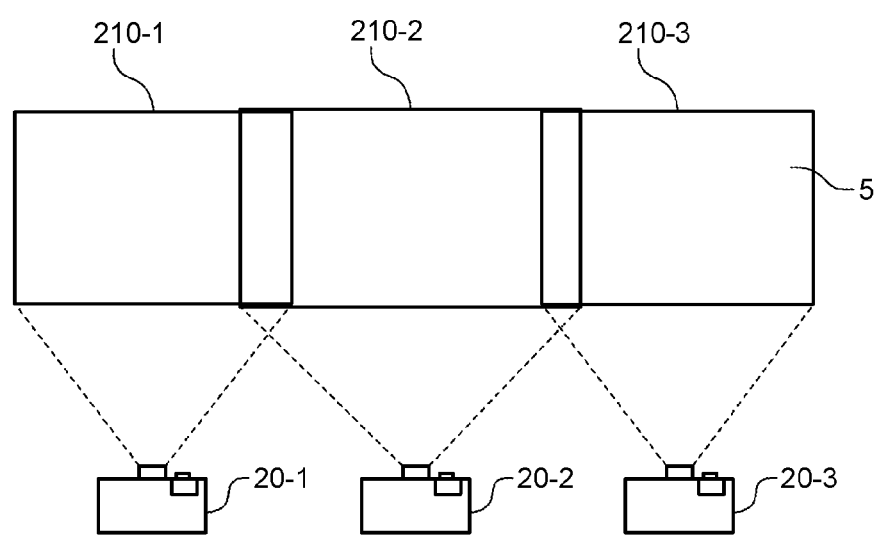
FIG. 5 is a diagram illustrating an example of a keystone-corrected projection area according to the first embodiment.

FIG. 5 is a diagram illustrating an example of keystone-corrected projection areas 210-1 to 210-3 according to the first embodiment. As illustrated in FIG. 5, each of the keystone-corrected projection areas 210-1 to 210-3 matches a portion of the projection medium 5. The projection area 210-1 is the projection area, which has undergone keystone correction, of the projection apparatus 20-1. The projection area 210-2 is the projection area, which has undergone keystone correction, of the projection apparatus 20-2. The projection area 210-3 is the projection area, which has undergone keystone correction, of the projection apparatus 20-3. The projection areas 210-1 to 210-3 and the projection medium 5 are on the same plane. Even after keystone correction is applied to the projection apparatuses 20-1 to 20-3, each adjacent pair of the projection areas 210-1 to 210-3 partially overlap each other. In other words, the projection area 210-1 partially overlaps the projection area 210-2. The projection area 210-2 partially overlaps the projection area 210-3.

Keystone correction using the keystone correction parameter is applied as follows. Although keystone correction is described by way of example of the projection apparatus 20-1, each of the projection apparatuses 20-2 and 20-3 applies keystone correction in a similar manner. First, the system control unit 35 reads the keystone correction parameter from the ROM 38 and transmits the keystone correction parameter to the image processing unit 26. The image processing unit 26 applies keystone correction to a projection target image using the keystone correction parameter. The optical-modulator control unit 25 causes the optical modulator 22 to display the keystone-corrected projection target image. The projection optical system 21 projects the keystone-corrected projection target image. Thus, the projection target image is projected on the projection area 210-1.

Figure 6:
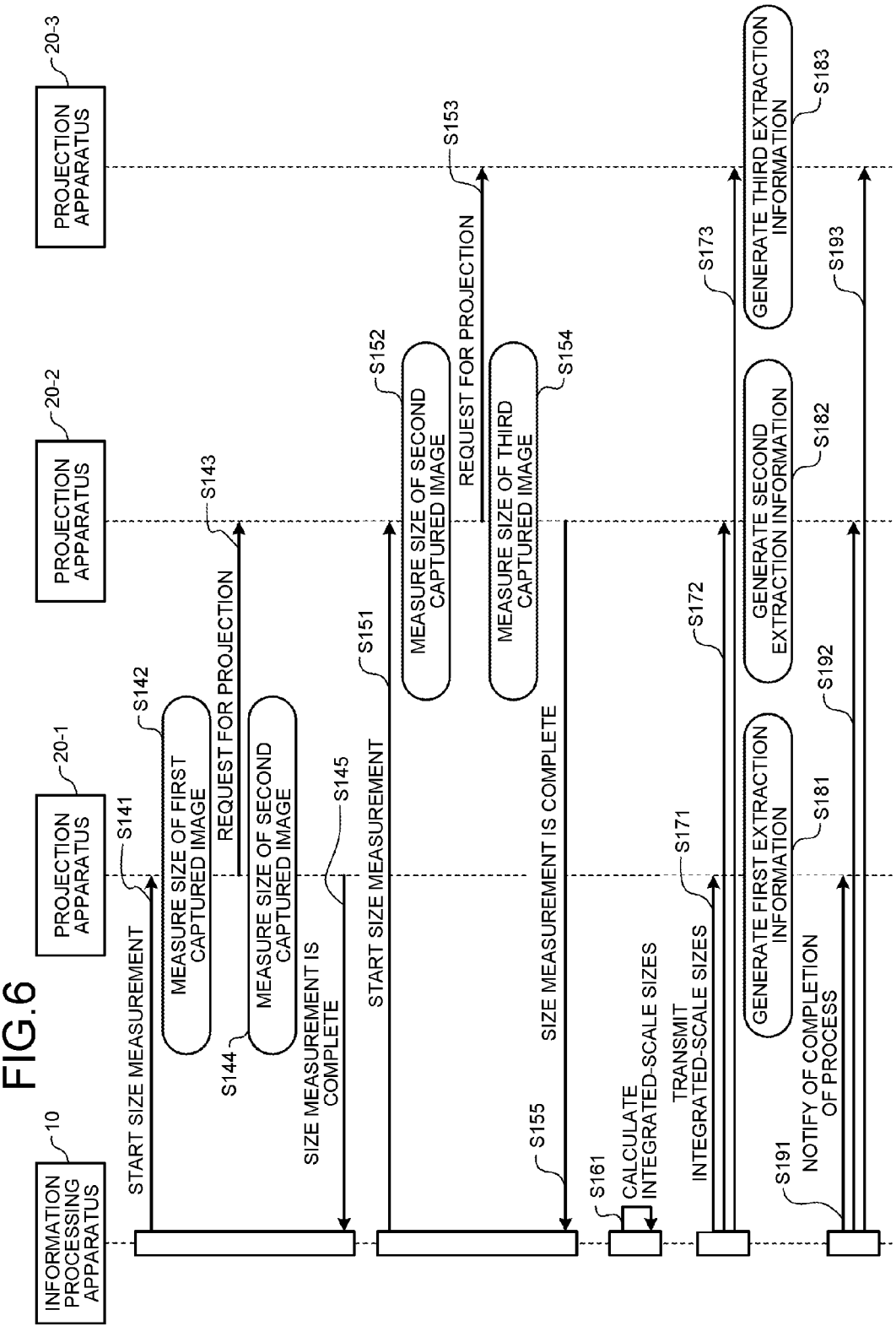
FIG. 6 is a sequence diagram illustrating an example of a size measurement process performed in the projection system according to the first embodiment.

FIG. 6 is a sequence diagram illustrating an example of a size measurement process performed in the projection system 1 according to the first embodiment.

Firstly, the control part 16 of the information processing apparatus 10 sends a command to start size measurement to the projection apparatus 20-1 (Step S141).

Upon receiving the command to start size measurement via the communication control unit 36 of the projection apparatus 20-1, the system control unit 35 of the projection apparatus 20-1 measures a size pertaining to a first captured image (Step S142). The first captured image is obtained by the projection apparatus 20-1 by capturing a first pattern image projected by the projection apparatus 20-1. The first pattern image may be, but not limited to, a check pattern image, for example. In the first embodiment, the first pattern image is a checkerboard pattern image.

Thereafter, the system control unit 35 of the projection apparatus 20-1 requests the projection apparatus 20 (in the first embodiment, the projection apparatus 20-2) adjacent to the projection apparatus 20-1 to project a second pattern image via the communication control unit 36 of the projection apparatus 20-1 (Step S143). The system control unit 35 measures a size of a second captured image (Step S144). The second captured image is obtained by the projection apparatus 20-1 by capturing the second pattern image projected by the projection apparatus 20-2. In the first embodiment, the second pattern image is a checkerboard pattern image as is the first pattern image.

Thereafter, the system control unit 35 of the projection apparatus 20-1 notifies the information processing apparatus 10 of completion of the size measurement, the size of the first captured image, and the size of the second captured image via the communication control unit 36 of the projection apparatus 20-1 (Step S145).

The operation from Step S142 to Step S145 is specifically described below with reference to FIG. 7.

Figure 7:
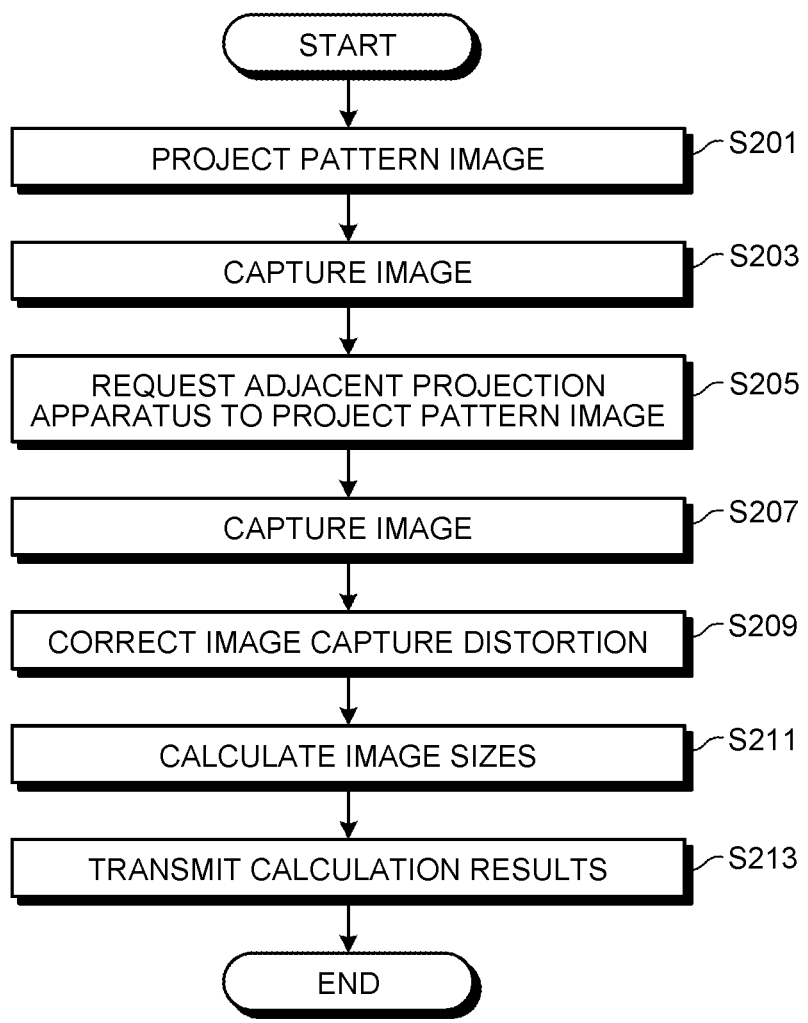
FIG. 7 is a flowchart illustrating a detailed example of the size measurement process performed in the projection system according to the first embodiment.

FIG. 7 is a flowchart illustrating a detailed example of the size measurement process performed in the projection system 1 according to the first embodiment.

Firstly, the system control unit 35 of the projection apparatus 20-1 reads the keystone correction parameter from the ROM 38 of the projection apparatus 20-1 and transmits the keystone correction parameter to the image processing unit 26 of the projection apparatus 20-1. The image processing unit 26 generates the first pattern image and applies keystone correction to the first pattern image using the keystone correction parameter. The optical-modulator control unit 25 of the projection apparatus 20-1 causes the optical modulator 22 of the projection apparatus 20-1 to display the keystone-corrected first pattern image. The projection optical system 21 of the projection apparatus 20-1 projects the keystone-corrected first pattern image (Step S201). Thus, the first pattern image is projected on the projection area 210-1 (which is an example of the first projection area).

In short, the image processing unit 26 of the projection apparatus 20-1 applies keystone correction to the first pattern image so that the first pattern image is projected on the projection area 210-1. The projection optical system 21 of the projection apparatus 20-1 projects the keystone-corrected first pattern image on the projection area 210-1.

Thereafter, upon receiving a command from the system control unit 35 of the projection apparatus 20-1, the camera unit 29 of the projection apparatus 20-1 performs image capture in the image capture area of the camera unit 29, thereby generating a first captured image where the first pattern image is captured (Step S203).

Figure 8:
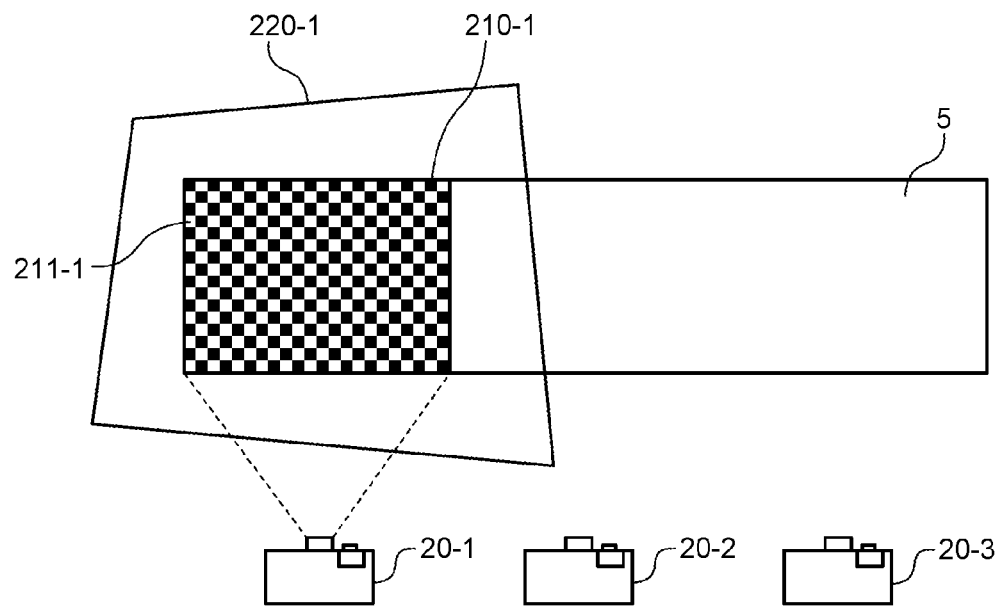
FIG. 8 is an explanatory diagram of an example of image capture to obtain a first captured image according to the first embodiment.

FIG. 8 is an explanatory diagram of an example of image capture to obtain a first captured image according to the first embodiment. As illustrated in FIG. 8, the projection apparatus 20-1 projects a first pattern image 211-1 on the projection area 210-1 which matches a portion of the projection medium 5, and performs image capture in an image capture area 220-1 which encompasses the projection area 210-1, thereby generating the first captured image. Because the projection apparatus 20-1 is not oriented exactly toward the projection medium 5 as described above, the image capture area 220-1 is distorted.

Because the image capture area 220-1 (which is the image capture area of the projection apparatus 20-1) encompasses the projection area 200-1 as described earlier, the image capture area 220-1 encompasses the projection area 210-1, to which the projection area 200-1 is keystone-corrected. As described earlier, the projection area 210-1 partially overlaps the projection area 210-2. Accordingly, the image capture area 220-1 includes the projection area 210-1 and a portion of the projection area 210-2.

An example in which the size of the first captured image is measured at Step S142 has been described with reference the sequence diagram of FIG. 6. Another example in which measurement is performed at Steps S209 to S211 after generation of the second captured image is described below. To adopt the operation from Step S209 to Step S211 of FIG. 7 to Step S142 of the sequence diagram of FIG. 6, measuring the size of the first captured image, which is involved in the operation from Step S209 to Step S211, may preferably be performed at Step S142.

Thereafter, the system control unit 35 of the projection apparatus 20-1 controls the optical-modulator control unit 25 of the projection apparatus 20-1 to cause the image optical modulator 22 of the projection apparatus 20-1 to stop displaying the keystone-corrected first pattern image, thereby causing the projection optical system 21 of the projection apparatus 20-1 to stop projecting the keystone-corrected first pattern image. The system control unit 35 of the projection apparatus 20-1 requests the projection apparatus 20-2 adjacent to the projection apparatus 20-1 to project the second pattern image via the communication control unit 36 of the projection apparatus 20-1 (Step S205).

In response to the request, the system control unit 35 of the projection apparatus 20-2 reads the keystone correction parameter from the ROM 38 of the projection apparatus 20-2 and transmits the keystone correction parameter to the image processing unit 26 of the projection apparatus 20-2. The image processing unit 26 generates the second pattern image and applies keystone correction to the second pattern image using the keystone correction parameter. The optical-modulator control unit 25 of the projection apparatus 20-2 causes the optical modulator 22 of the projection apparatus 20-2 to display the keystone-corrected second pattern image. The projection optical system 21 of the projection apparatus 20-2 projects the keystone-corrected second pattern image. Thus, the second pattern image is projected on the projection area 210-2 (which is an example of the second projection area). Thereafter, the system control unit 35 of the projection apparatus 20-2 notifies the projection apparatus 20-1 adjacent to the projection apparatus 20-2 that the second pattern image is projected via the communication control unit 36 of the projection apparatus 20-2.

In short, the image processing unit 26 of the projection apparatus 20-2 applies keystone correction to the second pattern image so that the second pattern image is projected on the projection area 210-2. The projection optical system 21 of the projection apparatus 20-2 projects the keystone-corrected second pattern image on the projection area 210-2 which partially overlaps the projection area 210-1.

Thereafter, upon receiving a command from the system control unit 35 of the projection apparatus 20-1, the camera unit 29 of the projection apparatus 20-1 performs image capture in the image capture area of the camera unit 29, thereby generating a second captured image where the second pattern image is captured (Step S207).

Figure 9:
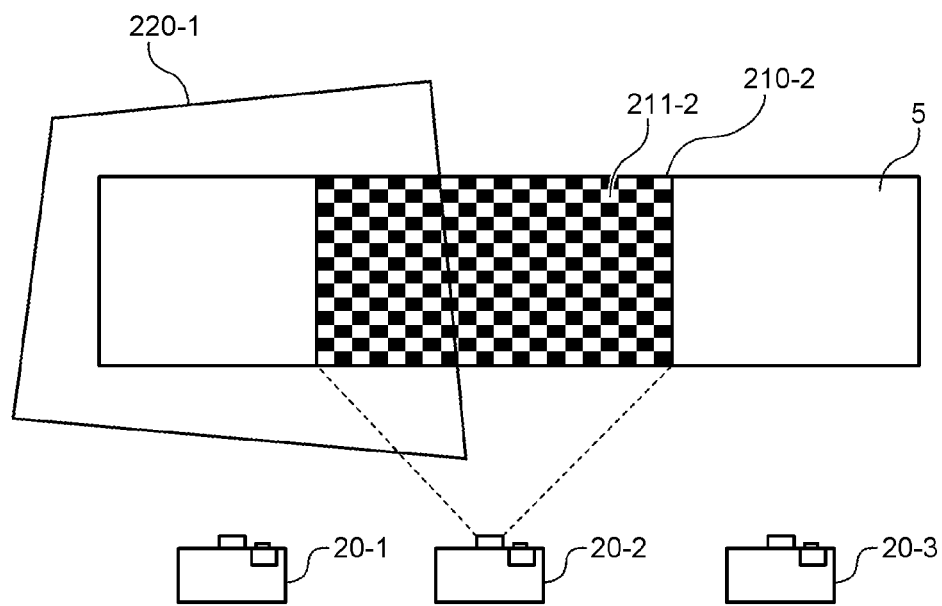
FIG. 9 is an explanatory diagram of image capture to obtain a second captured image according to the first embodiment.

FIG. 9 is an explanatory diagram of an example of image capture to obtain the second captured image according to the first embodiment. As illustrated in FIG. 9, the projection apparatus 20-1 projects a second pattern image 211-2 on the projection area 210-2 which matches a portion of the projection medium 5, and performs image capture in the image capture area 220-1 which encompasses a portion of the projection area 210-2 as described earlier, thereby generating the second captured image.

Thereafter, the camera-image processing unit 30 of the projection apparatus 20-1 applies image-capture-distortion correction to the first captured image and the second captured image captured by the camera unit 29 of the projection apparatus 20-1 (Step S209).

Figure 10:
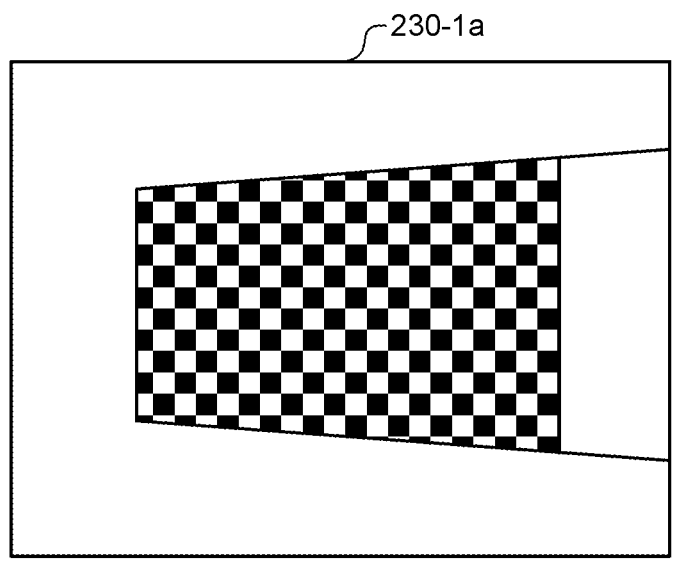
FIG. 10 is a diagram illustrating an example of a not-yet-image-capture-distortion-corrected first captured image according to the first embodiment.
Figure 11:
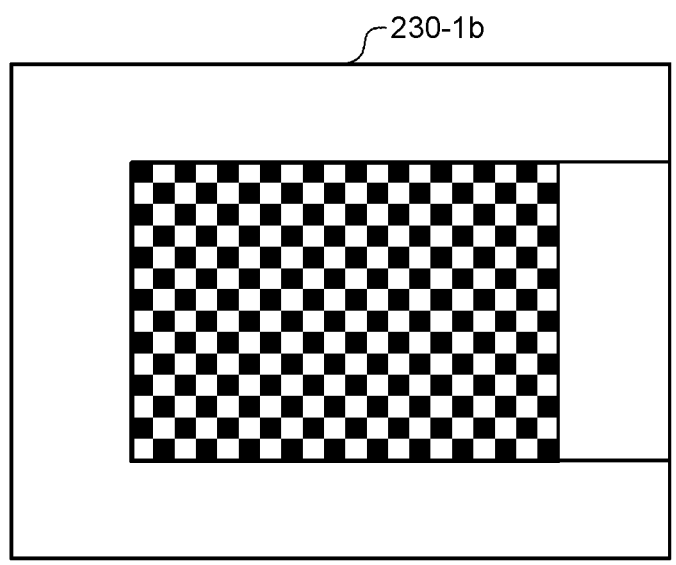
FIG. 11 is a diagram illustrating an example of an image-capture-distortion-corrected first captured image according to the first embodiment.

FIG. 10 is a diagram illustrating an example of a not-yet-image-capture-distortion-corrected first captured image 230-1a according to the first embodiment. FIG. 11 is a diagram illustrating an example of an image-capture-distortion-corrected first captured image 230-1b according to the first embodiment. The camera-image processing unit 30 of the projection apparatus 20-1 applies image-capture-distortion correction to the first captured image 230-1a captured by the projection apparatus 20-1 that is not oriented exactly toward the projection medium 5, thus correcting the first captured image 230-1a to the first captured image 230-1b which is an image virtually captured from a direction perpendicular to the projection medium 5. By this correction, the first captured image 230-1b is freed from the distortion that occurs in the first captured image 230-1a. The camera-image processing unit 30 of the projection apparatus 20-1 similarly corrects image capture distortion in the second captured image.

Technique for correcting such image capture distortion is known. An example of the technique is disclosed in Japanese Laid-open Patent Application No. 2013-42411. According to the technique disclosed in Japanese Laid-open Patent Application No. 2013-42411, a pattern image is projected by a real projector PRJr in a situation where it is assumed that a virtual projector PRJv including a camera mounted thereon is positioned on an extension in a direction N of the principal normal of a screen. The pattern image is captured with a camera mounted on the projector PRJr. A virtual image which appears to be captured from the virtual projector PRJv is calculated from the captured image using a perspective-projection transformation matrix P.

Thereafter, the camera-image processing unit 30 of the projection apparatus 20-1 calculates, as the size of the first captured image, a lateral length of the first pattern image using the image-capture-distortion-corrected first captured image. The camera-image processing unit 30 calculates a lateral length of the second pattern image and a lateral length of an overlapping portion between the first pattern image and the second pattern image using the image-capture-distortion-corrected first and second captured images (Step S211).

In short, the camera-image processing unit 30 determines image length information which includes the lateral length of the first pattern image, the lateral length of the second pattern image, and the lateral length of the overlapping portion between the first pattern image and the second pattern image using the first captured image and the second captured image.

Meanwhile, the camera-image processing unit 30 of the projection apparatus 20-1 determines the lateral length of the second pattern image using the lateral length of the first pattern image and a ratio between the lateral length of the first pattern image and the lateral length of the second pattern image. The ratio between the lateral length of the first pattern image and the lateral length of the second pattern image is determined as follows. The camera-image processing unit 30 determines a check-pattern unit length, which is the lateral length of a single rectangle in the check pattern, of the first pattern image from the first captured image, determines a check-pattern unit length of the second pattern image from the second captured image, and determines the ratio using the check-pattern unit length of the first pattern image and the check-pattern unit length of the second pattern image.

Meanwhile, the first pattern image generated by the camera-image processing unit 30 of the projection apparatus 20-1 and the second pattern image generated by the camera-image processing unit 30 of the projection apparatus 20-2 are identical pattern images of which checkerboard patterns match each other and of a same resolution. However, the keystone correction parameter used in keystone correction applied to the first pattern image and the keystone correction parameter used in keystone correction applied to the second pattern image differ from each other. Accordingly, the first pattern image and the second pattern image are enlarged/reduced differently in keystone correction. As a result, the size of the rectangle in the captured checkerboard pattern of the first captured image and the size of the rectangle in the captured checkerboard pattern in the second captured image differ from each other. Accordingly, the ratio between the lateral length of the first pattern image and the lateral length of the second pattern image can be determined from the ratio between the lateral length of the rectangle of the checkerboard pattern of the first pattern image and the lateral length of the rectangle of the checkerboard pattern of the second pattern image.

Figure 12:
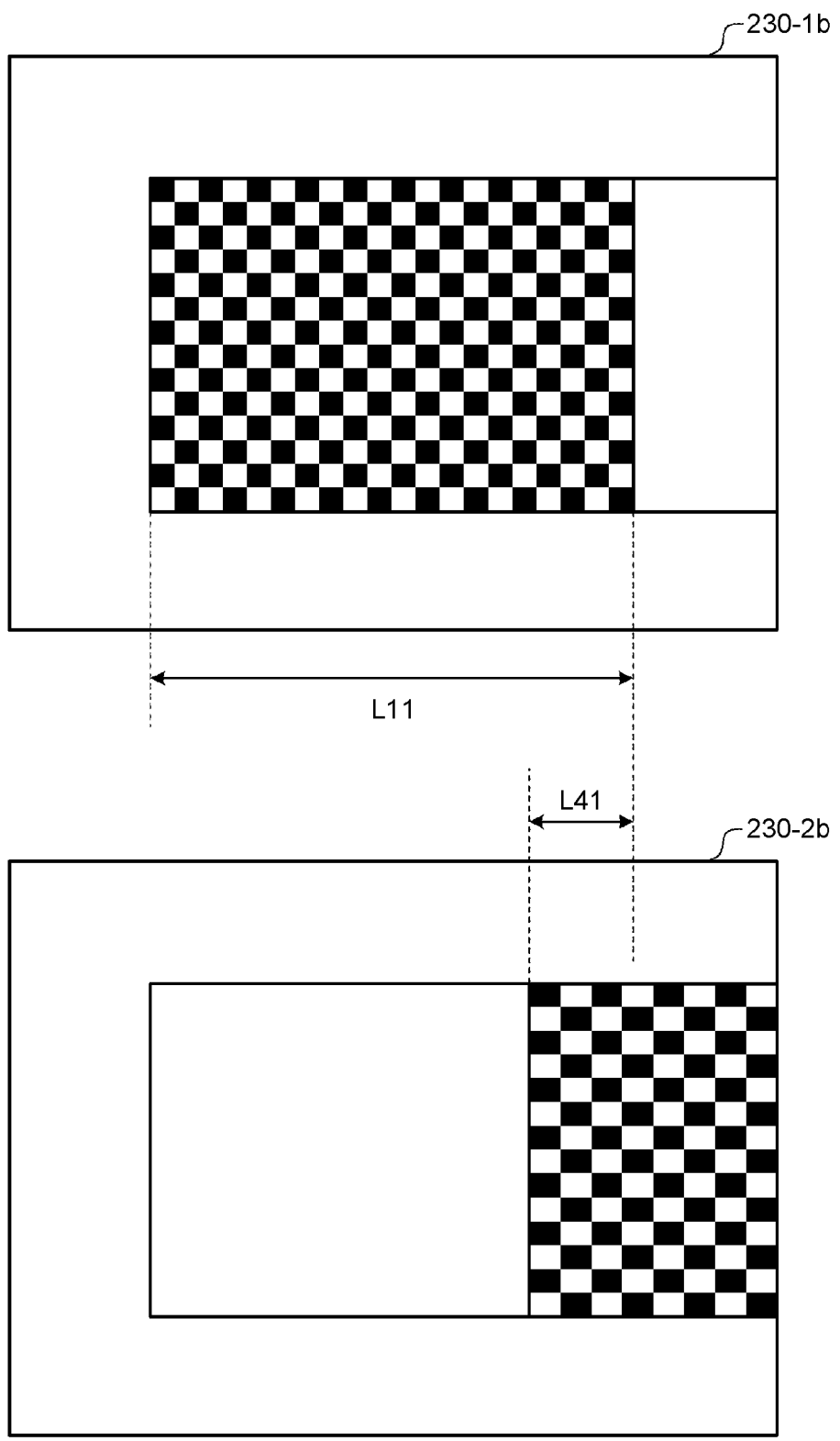
FIG. 12 is an explanatory diagram of an example method for determining image length information according to the first embodiment.
Figure 13:
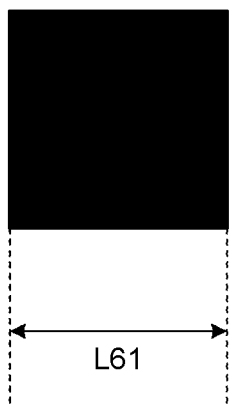
FIG. 13 is an explanatory diagram of the example method for determining the image length information according to the first embodiment.
Figure 14:
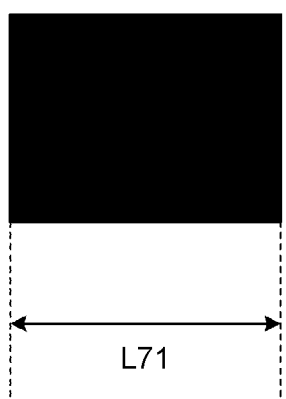
FIG. 14 is an explanatory diagram of the example method for determining the image length information according to the first embodiment.

FIGS. 12 to 14 are explanatory diagrams of an example method for determining the image length information according to the first embodiment. FIG. 12 is a diagram illustrating an example of relationship between the image-capture-distortion-corrected first captured image 230-1b and an image-capture-distortion-corrected second captured image 230-2b. FIG. 13 is an enlarged view of a rectangle in the check pattern (hereinafter, "check pattern rectangle") of the first pattern image captured in the image-capture-distortion-corrected first captured image 230-1b. FIG. 14 is an enlarged view of a check pattern rectangle of the second pattern image captured in the image-capture-distortion-corrected second captured image 230-2b.

As illustrated in FIG. 12, both ends of the first pattern image are captured in the image-capture-distortion-corrected first captured image 230-1b. For this reason, the camera-image processing unit 30 of the projection apparatus 20-1 calculates (determines) a lateral length L11 of the first pattern image by detecting the both ends of the first pattern image.

As illustrated in FIG. 12, the right end of the first pattern image is captured in the image-capture-distortion-corrected first captured image 230-1b; the left end of the second pattern image is captured in the image-capture-distortion-corrected second captured image 230-2b. For this reason, the camera-image processing unit 30 of the projection apparatus 20-1 calculates (determines) a lateral length L41 of the overlapping portion between the first pattern image and the second pattern image by detecting the right end of the first pattern image and the left end of the second pattern image.

As illustrated in FIGS. 12 to 14, the size of the check pattern rectangle of the first pattern image captured in the image-capture-distortion-corrected first captured image 230-1b differs from the size of the check pattern rectangle of the second pattern image captured in the image-capture-distortion-corrected second captured image 230-2b. Accordingly, the camera-image processing unit 30 of the projection apparatus 20-1 calculates (determines) a lateral length L61 of the check pattern rectangle of the first pattern image by detecting both ends of a check pattern rectangle of the first pattern image, and calculates (determines) a lateral length L71 of the check pattern rectangle of the second pattern image by detecting both ends of a check pattern rectangle of the second pattern image.

As illustrated in FIG. 12, although the left end of the second pattern image is captured in the image-capture-distortion-corrected second captured image 230-2b, the right end of the second pattern image is not captured therein. Accordingly, the camera-image processing unit 30 of the projection apparatus 20-1 calculates (determines) a lateral length L21 of the second pattern image from the lateral length L11 of the first pattern image using a ratio between the lateral length L61 of the check pattern rectangle of the first pattern image and the lateral length L71 of the check pattern rectangle of the second pattern image. More specifically, the camera-image processing unit 30 of the projection apparatus 20-1 calculates (determines) the lateral length L21 of the second pattern image using Equation (1).

$$L21 = L11 \times (L71/L61) \quad (1)$$

The camera-image processing unit 30 of the projection apparatus 20-1 transmits L11, L21, and L41, which are the calculation results, to the system control unit 35 of the projection apparatus 20-1 as the image length information. The system control unit 35 transmits the image length information to the information processing apparatus 10 via the communication control unit 36 of the projection apparatus 20-1 (Step S213).

The operation from Step S142 to Step S145 has been described in detail above.

Referring back to FIG. 6, the information processing apparatus 10, the projection apparatus 20-2, and the projection apparatus 20-3 perform an operation similar to that from Step S141 to Step S145 as an operation from Step S151 to Step S155.

At Steps S151 through S155, the operation performed by the projection apparatus 20-1 at Steps S141 through S145 is performed by the projection apparatus 20-2; the operation performed by the projection apparatus 20-2 at Steps S141 through S145 is performed by the projection apparatus 20-3.

At Steps S151 through S155, an image obtained by the projection apparatus 20-2 by capturing the second pattern image projected by the projection apparatus 20-2 is referred as a third captured image. An image obtained by the projection apparatus 20-2 by capturing a third pattern image projected by the projection apparatus 20-3 is referred to as a fourth captured image. In the first embodiment, the third pattern image is a checkerboard pattern image as are the first and second pattern images.

A lateral length of the second pattern image calculated at Steps S151 through S155 is denoted by L22. A lateral length of an overlapping portion between the second pattern image and the third pattern image is denoted by L52. A lateral length of the third pattern image is denoted by L32.

Note that it is not requisite to perform the operation from Step S151 to Step S151 after the operation from Step S141 to Step S145. The sequence of these operations can be arranged differently.

Thereafter, the control part 16 of the information processing apparatus 10 calculates the lateral length of an entire projection area using the image length information. In the first embodiment, the lateral length of the entire projection area is lateral length of a single projection area into which the projection areas 210-1 to 210-3 are combined. More specifically, the control part 16 calculates integrated-scale sizes of the projection areas 210-1 to 210-3 using the image length information fed from the projection apparatus 20-1 and the image length information fed from the projection apparatus 20-2 (Step S161).

In the first embodiment, the distance from the projection apparatus 20-1 to the projection medium 5 (the projection area 210-1) and the distance from the projection apparatus 20-2 to the projection medium 5 (the projection area 210-2) are not adjusted to be equal to each other. Accordingly, scale for the image length information fed from the projection apparatus 20-1 and scale for the image length information fed from the projection apparatus 20-2 differ from each other. For this reason, it is necessary for the control part 16 to calculate the integrated-scale sizes of the projection areas 210-1 to 210-3 by integrating the scales into one of the scales.

However, if the number of the projection apparatuses is two, only a single piece of the image length information is obtained. In such a case, it is not necessary to integrate different scales, and the lateral length of the entire projection area can be calculated using the image length information.

In the first embodiment, an example in which the integrated-scale sizes of the projection areas 210-1 to 210-3 are calculated by integrating the scales of the image length information to the scale of the image length information fed from the projection apparatus 20-1 is described. Alternatively, the integrated-scale sizes of the projection areas 210-1 to 210-3 may be calculated by integrating the scales of the image length information to the scale of the image length information fed from the projection apparatus 20-2.

More specifically, the control part 16 integrates the scale of the image length information fed from the projection apparatus 20-2 to the scale of the image length information fed from the projection apparatus 20-1 using the lateral length L21 of the second pattern image contained in the image length information fed from the projection apparatus 20-1 and the lateral length L22 of the second pattern image contained in the image length information fed from the projection apparatus 20-2.

For example, the control part 16 may integrate the scales as follows. The control part 16 converts the lateral length L52, which is contained in the image length information fed from the projection apparatus 20-2, of the overlapping portion between the second pattern image and the third pattern image to a lateral length L51 at the scale of the image length information fed from the projection apparatus 20-1 using Equation (2). The control part 16 converts the lateral length L32, which is contained in the image length information fed from the projection apparatus 20-2, of the third pattern image into a lateral length L31 at the scale of the image length information fed from the projection apparatus 20-1 using Equation (3).

$$L51=L52\times(L21/L22) \qquad (2)$$

$$L31=L32\times(L21/L22) \qquad (3)$$

The control part 16 calculates an integrated-scale lateral length L1 (the lateral length of the entire projection area) of the single projection area into which the projection areas 210-1 to 210-3 are combined at the integrated-scale using Equation (4).

$$L1=L11+L21+L31-L41-L51 \qquad (4)$$

Thereafter, the control part 16 transmits the integrated-scale sizes (L1, L11, L21, L31, L41, and L51) and a lateral length LC of the projection target image to the projection apparatuses 20-1 to 20-3 (Steps S171 to S173). Upon receiving the integrated-scale sizes and the lateral length LC of the projection target image via the communication control unit 36, the system control unit 35 of each of the projection apparatuses 20 generates extraction information and stores the extraction information in the ROM 38 (Steps S181 to S183).

The extraction information is information specifying a position where a partial projection-target image, which is to be projected, is to be extracted from the projection target image. More specifically, the extraction information indicates an extraction start position and an extraction length according to which the partial projection-target image is to be extracted from the projection target image.

For instance, the system control unit 35 of the projection apparatus 20-1 may calculate a first extraction start position (0) and a first extraction length ((L11/L1)×LC)) as first extraction information for extracting a first partial projection-target image, which is to be projected by the projection apparatus 20-1, from the projection target image.

Put another way, the system control unit 35 of the projection apparatus 20-1 generates the first extraction information based on the image length information and the lateral length of the projection target image.

For instance, the system control unit 35 of the projection apparatus 20-2 may calculate a second extraction start position (((L11−L41)/L1)×LC) and a second extraction length ((L21/L1)×LC)) as second extraction information for extracting a second partial projection-target image, which is to be projected by the projection apparatus 20-2, from the projection target image.

Put another way, the system control unit 35 of the projection apparatus 20-2 generates the second extraction information based on the image length information and the lateral length of the projection target image.

For instance, the system control unit 35 of the projection apparatus 20-3 may calculate a third extraction start position (((L11+L21−L41−L51)/L1)×LC) and a third extraction length ((L31/L1)×LC)) as third extraction information for extracting a third partial projection-target image, which is to be projected by the projection apparatus 20-3, from the projection target image.

Thereafter, the control part 16 notifies the projection apparatuses 20-1 to 20-3 of completion of the process. Upon being notified of completion of the process via the communication control unit 36, the system control unit 35 of each of the projection apparatuses 20 completes the process (Steps S191 to S193).

Thereafter, upon receiving a video signal representing the projection target image output from the information processing apparatus 10, each of the projection apparatuses 20 extracts a partial projection-target image using the extraction information of the projection apparatus 20 from the projection target image, applies keystone correction to the extracted partial projection-target image, and projects the keystone-corrected partial projection-target image.

For example, in the projection apparatus 20-1, the system control unit 35 reads the first extraction information and the keystone correction parameter from the ROM 38 and transmits the first extraction information and the keystone correction parameter to the image processing unit 26. The video-signal processing unit 27 processes the video signal representing the projection target image fed from the information processing apparatus 10 via the video terminal 28 and transmits the processed video signal to the image processing unit 26. The image processing unit 26 extracts a first partial projection-target image from the projection target image using the first extraction information and applies keystone correction to the first partial projection-target image using the keystone correction parameter. If resolution of the extracted first partial projection-target image differs from resolution of the projection apparatus 20-1 (more specifically, the resolution of the optical modulator 22 of the projection apparatus 20-1), the image processing unit 26 converts the resolution of the extracted first partial projection-target image using a ratio α based on the resolutions, and thereafter applies keystone correction to the first partial projection-target image. Note that a value of the ratio α in the X direction is equal to that in the Y direction. The optical-modulator control unit 25 causes the optical modulator 22 to display the keystone-corrected first partial projection-target image. The projection optical system 21 projects the keystone-corrected first partial projection-target image. Thus, the first partial projection-target image is projected on the projection area 210-1.

In short, the projection optical system 21 of the projection apparatus 20-1 projects the first partial projection-target image extracted from the projection target image based on the first to fourth captured images and the projection target image on the projection area 210-1.

For example, in the projection apparatus 20-2, the system control unit 35 reads the second extraction information and the keystone correction parameter from the ROM 38 and transmits the second extraction information and the keystone correction parameter to the image processing unit 26. The video-signal processing unit 27 processes the video signal representing the projection target image fed from the information processing apparatus 10 via the video terminal 28 and transmits the processed video signal to the image processing unit 26. The image processing unit 26 extracts a second partial projection-target image from the projection target image using the second extraction information and applies keystone correction to the second partial projection-target image using the keystone correction parameter. If the resolution of the extracted second partial projection-target image differs from resolution of the projection apparatus 20-2 (more specifically, the resolution of the optical modulator 22 of the projection apparatus 20-2), the image processing unit 26 converts the resolution of the extracted second partial projection-target image using a ratio β based on the resolutions, and thereafter applies keystone correction to the second partial projection-target image. Note that a value of the ratio β in the X direction is equal to that in the Y direction. The optical-modulator control unit 25 causes the optical modulator 22 to display the keystone-corrected second partial projection-target image. The projection optical system 21 projects the keystone-corrected second partial projection-target image. Thus, the second partial projection-target image is projected on the projection area 210-2.

In short, the projection optical system 21 of the projection apparatus 20-2 projects the second partial projection-target image extracted from the projection target image based on the first to fourth captured images and the projection target image on the projection area 210-2.

For example, in the projection apparatus 20-3, the system control unit 35 reads the third extraction information and the keystone correction parameter from the ROM 38 and transmits the third extraction information and the keystone correction parameter to the image processing unit 26. The video-signal processing unit 27 processes the video signal representing the projection target image fed from the information processing apparatus 10 via the video terminal 28 and transmits the processed video signal to the image processing unit 26. The image processing unit 26 extracts a third partial projection-target image from the projection target image using the third extraction information and applies keystone correction to the third partial projection-target image using the keystone correction parameter. If the resolution of the extracted third partial projection-target image differs from resolution of the projection apparatus 20-3 (more specifically, the resolution of the optical modulator 22 of the projection apparatus 20-3), the image processing unit 26 converts the resolution of the extracted third partial projection-target image using a ratio γ based on the resolutions, and thereafter applies keystone correction to the third partial projection-target image. Note that a value of the ratio γ in the X direction is equal to that in the Y direction. The optical-modulator control unit 25 causes the optical modulator 22 to display the keystone-corrected third partial projection-target image. The projection optical system 21 projects the keystone-corrected third partial projection-target image. Thus, the third partial projection-target image is projected on the projection area 210-3.

Figure 15:
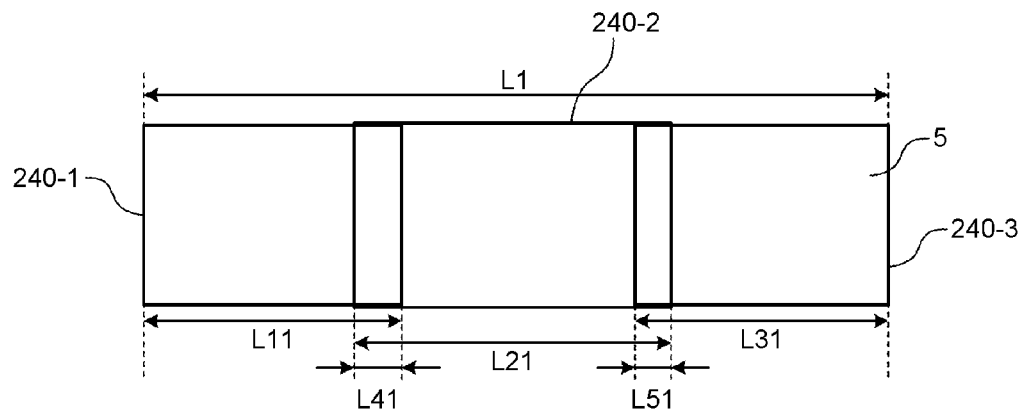
FIG. 15 is an explanatory diagram of an example of tiled display according to the first embodiment.

FIG. 15 is an explanatory diagram of an example of tiled display according to the first embodiment. A first partial projection-target image 240-1, a second partial projection-target image 240-2, and a third partial projection-target image 240-3 are displayed on the projection medium 5 in a tiled manner as illustrated in FIG. 15. The first partial projection-target image 240-1 is projected on the projection area 210-1. The second partial projection-target image 240-2 is projected on the projection area 210-2. The third partial projection-target image 240-3 is projected on the projection area 210-3. Note that the lateral lengths L1, L11, L21, L31, L41, and L51 in FIG. 15 are converted with reference to the scale of the lateral length LC in practice.

As described above, according to the first embodiment, the need of capturing the entire projection area at a time is eliminated. Accordingly, because the need of arranging an image capturing unit at a certain distance or further away from a projection medium or employing a wide-angle lens is eliminated, cost and constraint on arrangement can be reduced.

In particular, according to the first embodiment, it is only necessary that every projection apparatus except for one projection apparatus be capable of capturing the projection apparatus's projection area which partially overlaps an adjacent projection area. Accordingly, multiple projection can be implemented using projection apparatuses each including an image capturing unit. Because multiple projection can be implemented in any environment where the projection apparatuses can be arranged, constraint on arrangement will be considerably reduced.

Second Embodiment

A second embodiment is described below. The second embodiment is an example which implements interactive operation in such a manner that, when a pointed position is pointed in any one of multiple partial projection-target images projected on a projection medium with a pointing device, a predetermined image appears at the pointed position. The discussion below primarily focuses on what makes the second embodiment differ from the first embodiment. Like names and reference numerals will be used to designate similar elements in the first and second embodiments and repeated description is omitted.

Figure 16:
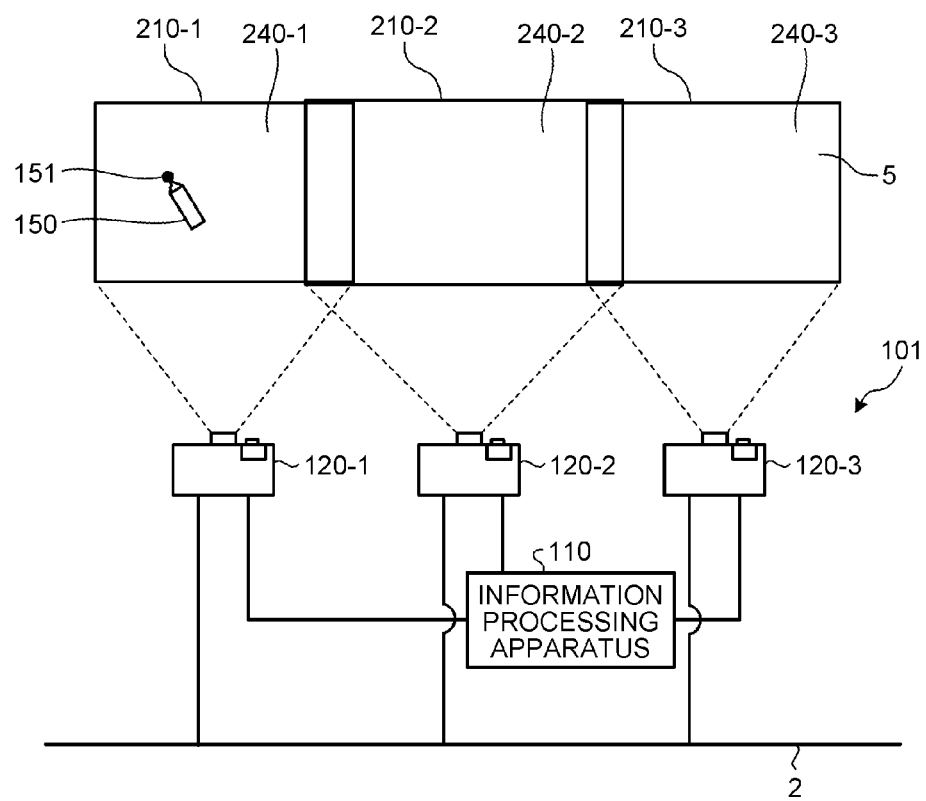
FIG. 16 is a block diagram illustrating an example configuration of a projection system according to a second embodiment of the present invention.

FIG. 16 is a block diagram illustrating an example configuration of a projection system 101 according to the second embodiment. As illustrated in FIG. 16, the second embodiment differs from the first embodiment in that the projection system 101 further includes a pointing device 150, and in including an information processing apparatus 110 and projection apparatuses 120-1 to 120-3 in lieu of the information processing apparatus 10 and projection apparatuses 20-1 to 20-3.

The pointing device 150 is configured to point an arbitrary position on the first partial projection-target image 240-1, the second partial projection-target image 240-2, and the third partial projection-target image 240-3 projected on the projection medium 5 with a distal end of the pointing device 150, thereby indicating a pointed position 151. The pointing device 150 may be embodied as an operating device having a shape of a pen, a wand, or the like suitable to be held in user's hand.

Figure 17:
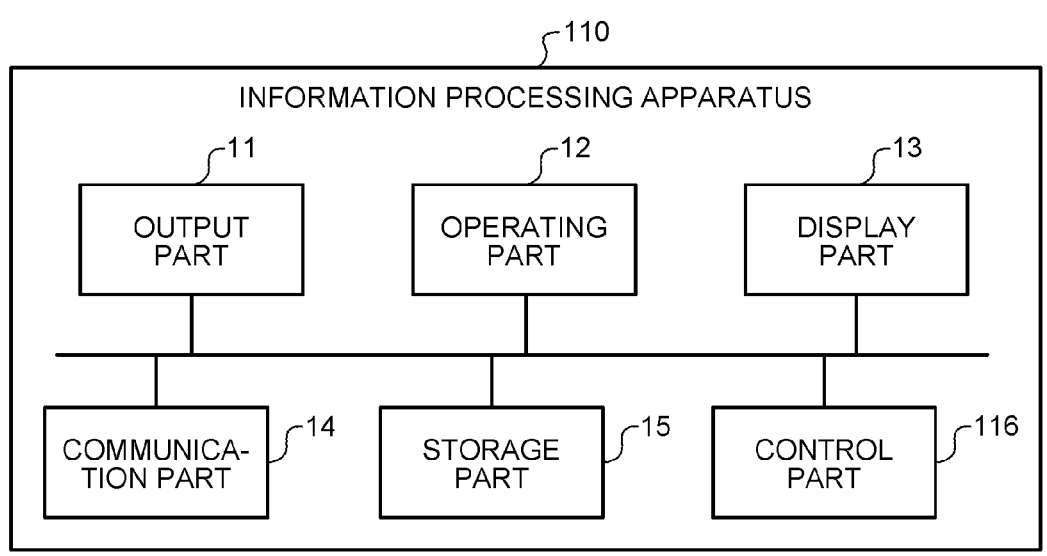
FIG. 17 is a block diagram illustrating an example configuration of an information processing apparatus according to the second embodiment.

FIG. 17 is a block diagram illustrating an example configuration of the information processing apparatus 110 according to the second embodiment. As illustrated in FIG. 17, the information processing apparatus 110 according to the second embodiment includes a control part 116 rather than the control part 16. The control part 116 is an example of the calculation unit and the superimposing unit described in Claims.

Figure 18:
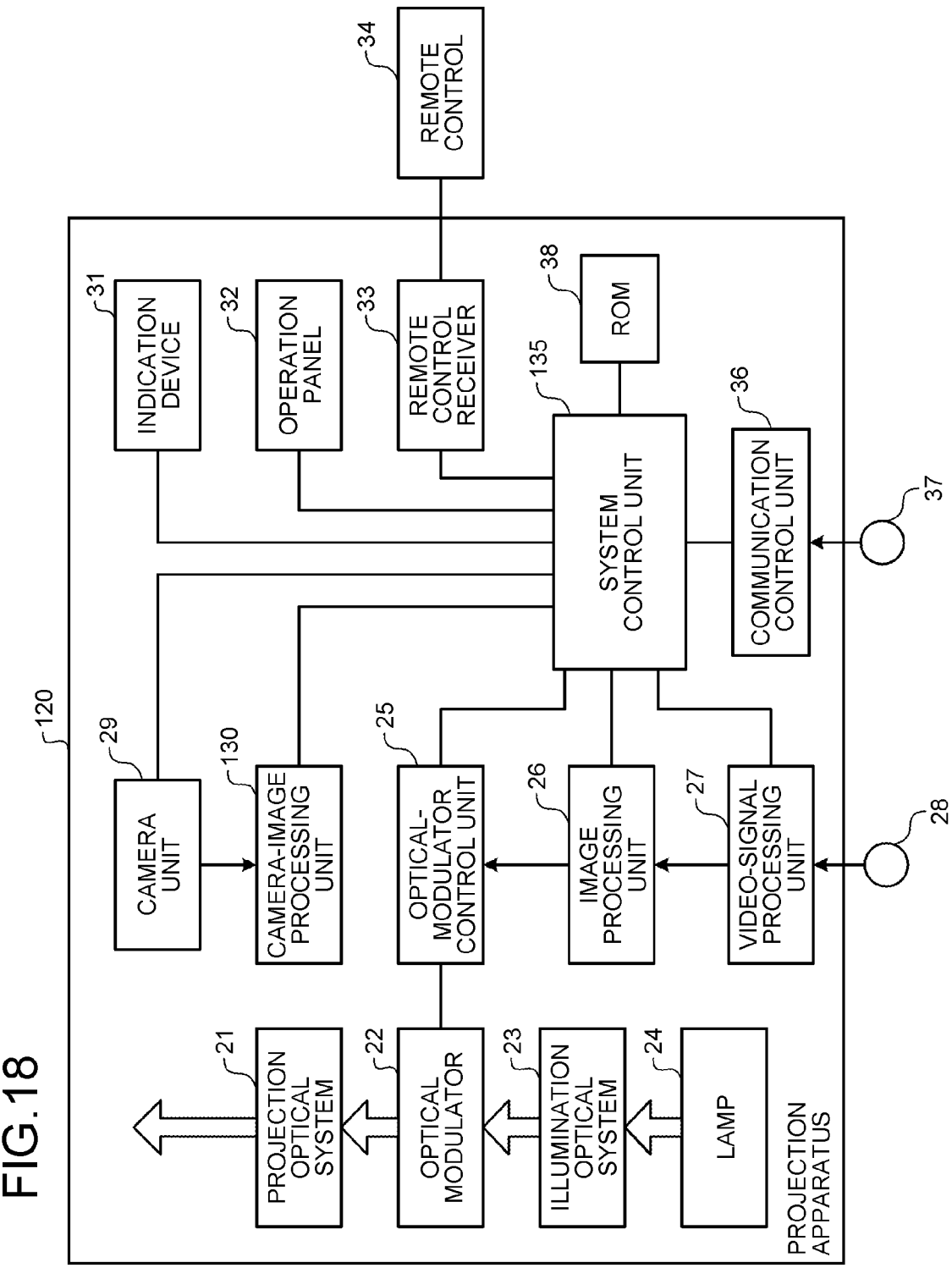
FIG. 18 is a block diagram illustrating an example configuration of a projection apparatus according to the second embodiment.

FIG. 18 is a block diagram illustrating an example configuration of the projection apparatus 120 according to the second embodiment. As illustrated in FIG. 18, the projection apparatus 120 according to the second embodiment includes a camera-image processing unit 130 and a system control unit 135 rather than the camera-image processing unit 30 and the system control unit 35. In the second embodiment, the camera unit 29 may be configured to be capable of either image capture using visible light or image capture using invisible light (e.g., infrared light).

The camera-image processing unit 130 of the projection apparatus 120-1 is an example of the image-length-information determining unit, the image-capture-distortion correcting unit, and the first detection unit described in Claims. The system control unit 135 of the projection apparatus 120-1 is an example of the first generation unit, the first calibration unit, and the first position determining unit described in Claims. The camera unit 29 of the projection apparatus 120-2 is an example of the second image capturing unit described in Claims. The camera-image processing unit 130 of the projection apparatus 120-2 is an example of the second detection unit described in Claims. The system control unit 135 of the projection apparatus 120-2 is an example of the second generation unit, the second calibration unit, and the second position determining unit described in Claims.

Specific operations of the information processing apparatus 110 and the projection apparatuses 120 are described below. As described earlier, the discussion below primarily focuses on what makes the second embodiment differ from the first embodiment. Accordingly, only operations that are specific to the second embodiment are described below, and description of operations which are common between the first and second embodiments is omitted.

Figure 19:
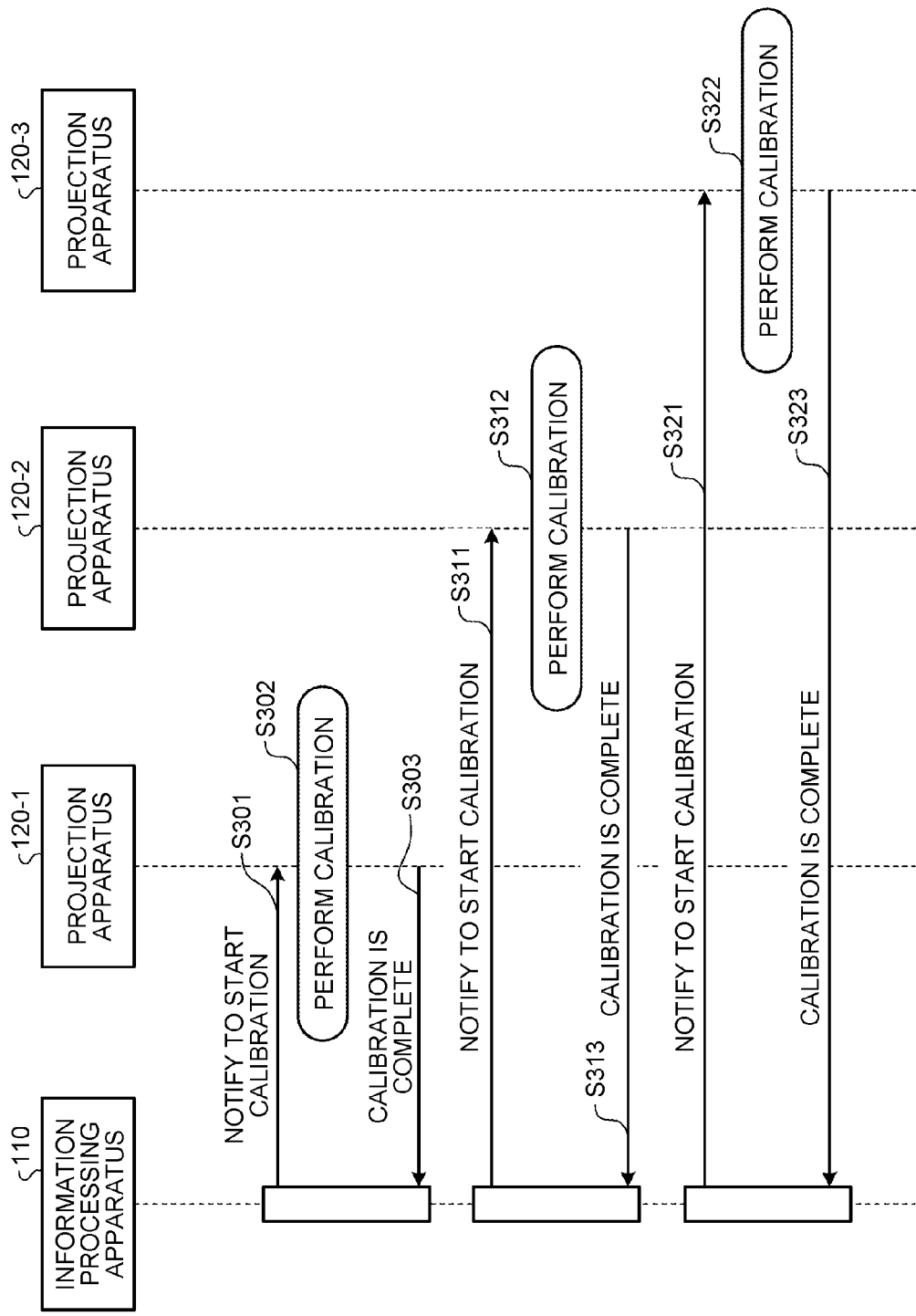
FIG. 19 is a sequence diagram illustrating an example of a calibration process performed in the projection system according to the second embodiment.

FIG. 19 is a sequence diagram illustrating an example of a calibration process performed in the projection system 101 according to the second embodiment. The calibration process illustrated in FIG. 19 is performed after the keystone-correction-parameter calculation process (FIG. 4) and the size measurement process (FIG. 6) both described in the first embodiment.

The control part 116 of the information processing apparatus 110 sends a command to start calibration to the projection apparatus 120-1 first (Step S301).

Upon receiving the command to start calibration via the communication control unit 36, the system control unit 135 of the projection apparatus 120-1 causes calibration to be performed (Step S302).

In the second embodiment, calibration is performed by calculating calibration information about correspondence between a projected calibration image and a captured calibration image obtained by capturing the projected calibration image. The calibration information is, more specifically, a coordinate transformation parameter for transforming a position (more specifically, position coordinates) on the captured calibration image to a position (more specifically, position coordinates) on the projected calibration image. The calibration information will be used in a pointed-position determining process which will be described later. There are two types of calibration: automatic calibration and manual calibration. The system control unit 135 may perform either automatic calibration or manual calibration.

First, automatic calibration is specifically described below.

The system control unit 135 of the projection apparatus 120-1 reads a keystone correction parameter from the ROM 38 of the projection apparatus 120-1 and transmits the keystone correction parameter to the image processing unit 26 of the projection apparatus 120-1. The image processing unit 26 generates a first calibration image and applies keystone correction to the first calibration image using the keystone correction parameter. The optical-modulator control unit 25 of the projection apparatus 120-1 causes the optical modulator 22 of the projection apparatus 120-1 to display the keystone-corrected first calibration image. The projection optical system 21 of the projection apparatus 120-1 projects the keystone-corrected first calibration image. Thus, the first calibration image is projected on the projection area 210-1.

In short, the image processing unit 26 of the projection apparatus 120-1 applies keystone correction to the first calibration image so that the first calibration image is projected on the projection area 210-1. The projection optical system 21 of the projection apparatus 120-1 projects the keystone-corrected first calibration image on the projection area 210-1.

Examples of the first calibration image for automatic calibration include an image where a characteristic graphics object, such as a circle and/or a line, is arranged at a specific location, such as four corners or the center, of the image.

Thereafter, upon receiving a command from the system control unit 135 of the projection apparatus 120-1, the camera unit 29 of the projection apparatus 120-1 performs image capture in the image capture area 220-1 of the camera unit 29, thereby generating a captured first calibration image where the first calibration image is captured.

Thereafter, the camera-image processing unit 130 of the projection apparatus 120-1 analyzes the generated captured first calibration image and detects position coordinates of contours and position coordinates of the characteristic graphics object described earlier of the captured first calibration image.

Thereafter, the system control unit 135 of the projection apparatus 120-1 obtains the captured first calibration image from the image processing unit 26 and obtains the position coordinates of the contours of the captured first calibration image and the position coordinates of the characteristic graphics object from the camera-image processing unit 130. The system control unit 135 calculates first calibration information about correspondence between the first calibration image and the captured first calibration image by obtaining correspondence between the first calibration image and the captured first calibration image through comparison of the position coordinates of the contours and the position coordinates of the characteristic graphics object between the captured first calibration image and the first calibration image.

Meanwhile, the position coordinates of the contours and the position coordinates of the characteristic graphics object of the first calibration image are known. The first calibration information is, more specifically, a first coordinate-transformation parameter for transforming position coordinates on the captured first calibration image to position coordinates on the first calibration image.

Thereafter, the system control unit 135 stores the calculated first calibration information in the ROM 38 of the projection apparatus 120-1.

Automatic calibration has been specifically described above.

Figure 20:
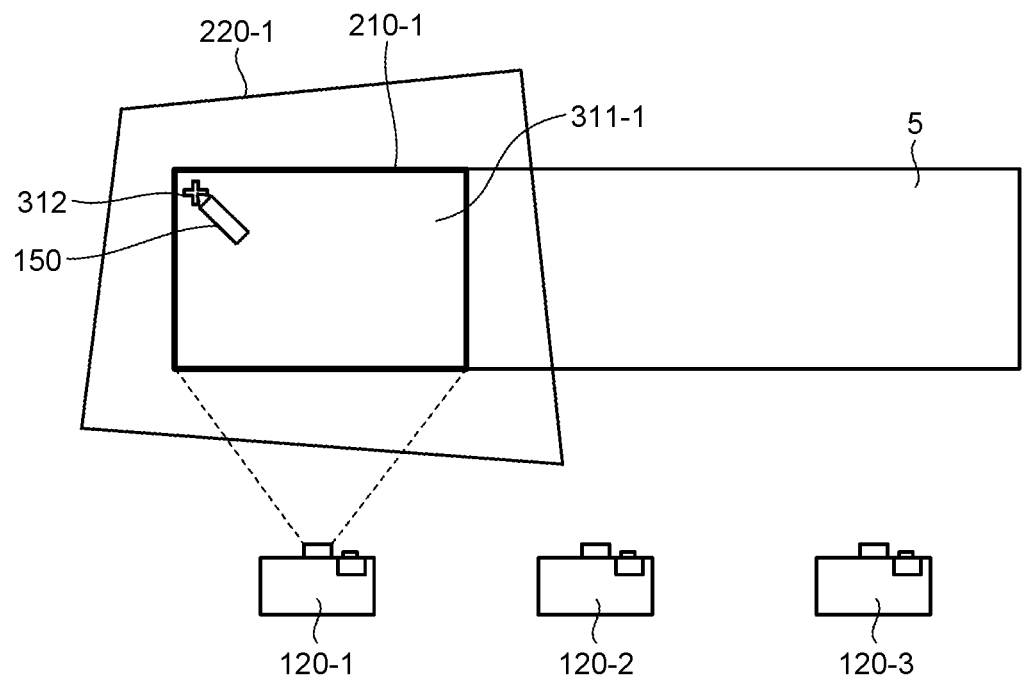
FIG. 20 is an explanatory diagram of an example of manual calibration according to the second embodiment.

Next, manual calibration is specifically described below.
FIG. 20 is an explanatory diagram of an example of manual calibration according to the second embodiment.

A first calibration image is projected as in automatic calibration. However, in contrast to the first calibration image for automatic calibration, the first calibration image for manual calibration is, for example, an image where a mark is arranged at a specific location such as a corner or the center of the image.

Thereafter, upon receiving a command from the system control unit 135 of the projection apparatus 120-1 in a state where a user is pointing the mark on the first calibration image projected on the projection area 210-1 with the distal end of the pointing device 150, the camera unit 29 of the projection apparatus 120-1 performs image capture in the image capture area 220-1 of the camera unit 29, thereby generating a captured first calibration image where the first calibration image is captured. For instance, in a state where a user is pointing a mark 312 on a first calibration image 311-1 projected on the projection area 210-1 with the distal end of the pointing device 150 as illustrated in FIG. 20, the camera unit 29 of the projection apparatus 120-1 performs image capture in the image capture area 220-1 of the camera unit 29, thereby generating a captured first calibration image where the first calibration image 311-1 is captured.

If the camera unit 29 is configured to capture an image with invisible light, the camera unit 29 may preferably capture an image in a state where the mark on the first calibration image projected on the projection area 210-1 is pointed with invisible light emitted from the distal end of the pointing device 150.

Thereafter, the camera-image processing unit 130 of the projection apparatus 120-1 analyzes the generated captured first calibration image and detects position coordinates of the pointed position (which is the position of the mark) pointed with the pointing device 150.

Thereafter, the system control unit 135 of the projection apparatus 120-1 obtains the first calibration image from the image processing unit 26 and obtains the position coordinates of the pointed position on the captured first calibration image from the camera-image processing unit 130. The system control unit 135 obtains correspondence between the first calibration image and the captured first calibration image through comparison between the position coordinates of the pointed position on the captured first calibration image and the position coordinates of the mark on the first calibration image. Meanwhile, the position coordinates of the mark on the first calibration image are known.

The system control unit 135 calculates, as the first calibration information, the first coordinate-transformation parameter for transforming position coordinates on the captured first calibration image to position coordinates on the first calibration image by repeating the operation described above while changing the position of the mark arranged on the first calibration image.

Thereafter, the system control unit 135 stores the calculated first calibration information in the ROM 38 of the projection apparatus 120-1.

Manual calibration has been specifically described above.

Thereafter, the system control unit 135 of the projection apparatus 120-1 notifies the information processing apparatus 110 that calibration is complete via the communication control unit 36 (Step S303). The information processing apparatus 110 and the projection apparatus 120-2 perform an operation similar to that from Step S301 to Step S303 as an operation from Step S311 to Step S313. The information processing apparatus 110 and the projection apparatus 120-3 perform an operation similar to that from Step S301 to Step S303 as an operation from Step S321 to Step S323.

Meanwhile, a second calibration image, a captured second calibration image, and second calibration information in calibration performed by the projection apparatus 120-2 correspond respectively to the first calibration image, the captured first calibration image, and the first calibration information in calibration performed by the projection apparatus 120-1. A third calibration image, a captured third calibration image, and third calibration information in calibration performed by the projection apparatus 120-3 correspond respectively to the first calibration image, the captured first calibration image, and the first calibration information in calibration performed by the projection apparatus 120-1.

The first to third calibration images are identical calibration images which are also identical in resolution. However, the keystone correction parameters used in keystone correction applied to the first to third calibration images differ from each other. Accordingly, the first to third calibration images are projected after being enlarged/reduced differently in keystone correction.

Figure 21:
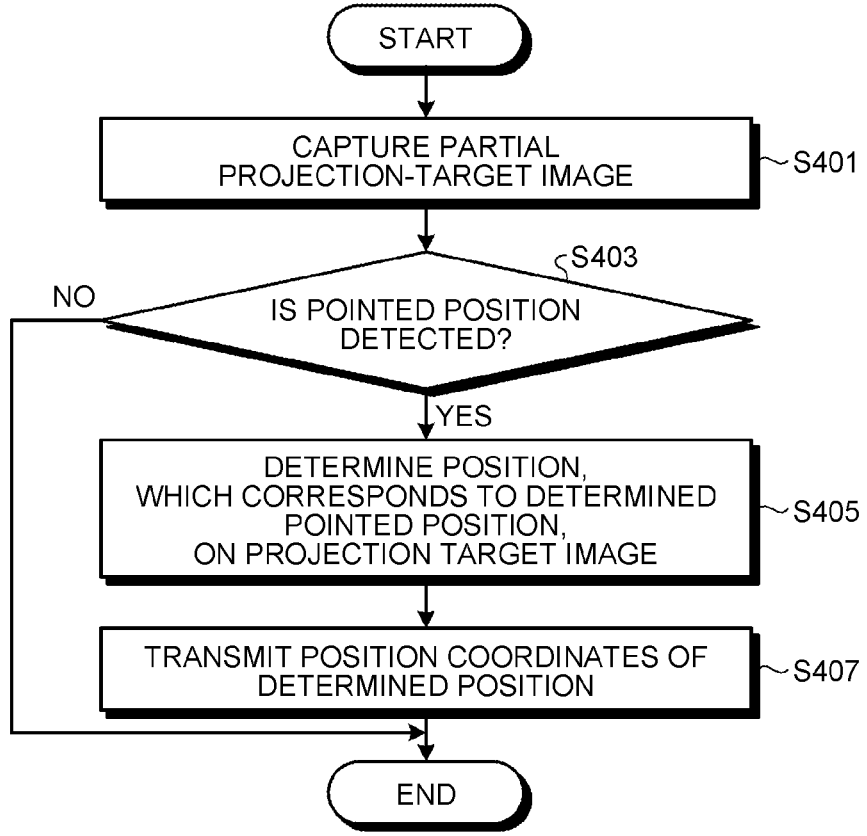
FIG. 21 is a flowchart illustrating an example of a pointed-position determining process performed by the projection apparatus according to the second embodiment.

FIG. 21 is a flowchart illustrating an example of a pointed-position determining process performed by the projection apparatus 120 according to the second embodiment. The pointed-position determining process illustrated in FIG. 21 is performed periodically by each of the projection apparatuses 120-1 to 120-3 after the first to third partial projection-target images 240-1 to 240-3 described in the first embodiment have been projected (displayed in the tiled manner) on the projection medium 5. Although the pointed-position determining process is described by way of example of the projection apparatus 120-1, each of the projection apparatuses 120-2 and 120-3 performs the pointed-position determining process in a similar manner.

First, upon receiving a command from the system control unit 135 of the projection apparatus 120-1, the camera unit 29 of the projection apparatus 120-1 performs image capture in the image capture area of the camera unit 29, thereby generating a first captured partial image where the first partial projection-target image 240-1 is captured (Step S401).

Thereafter, the camera-image processing unit 130 of the projection apparatus 120-1 analyzes the generated first captured partial image.

If a pointed position is pointed on the first partial projection-target image 240-1 with the pointing device 150 at the moment when the image is captured by the camera unit 29, the camera-image processing unit 130 detects the pointed position (more specifically, position coordinates of the pointed position) on the first captured partial image in the analysis of the first captured partial image (Yes at Step S403).

On the other hand, if a pointed position is not pointed on the first partial projection-target image 240-1 with the pointing device 150 at the moment when the image is captured by the camera unit 29, the camera-image processing unit 130 does not detect a pointed position on the first captured partial image in the analysis of the first captured partial image (No at Step S403), and the pointed-position determining process ends.

If the camera unit 29 is configured to capture invisible light, the pointing device 150 may preferably point a pointed position with invisible light emitted from the distal end of the pointing device 150.

If the pointed position on the first captured partial image is detected (Yes at Step S403), the system control unit 135 of the projection apparatus 120-1 obtains the position coordinates of pointed position on the first captured partial image from the camera-image processing unit 130, and determines a position (more specifically, position coordinates), which corresponds to the pointed position on the first captured partial image, on the projection target image (Step S405). The projection target image is the first partial projection-target image 240-1 that is extracted.

Thereafter, the system control unit 135 of the projection apparatus 120-1 transmits the position coordinates of the position, which corresponds to the pointed position on the first captured partial image, on the projection target image to the information processing apparatus 110 via the communication control unit 36 (Step S407).

Figure 22:
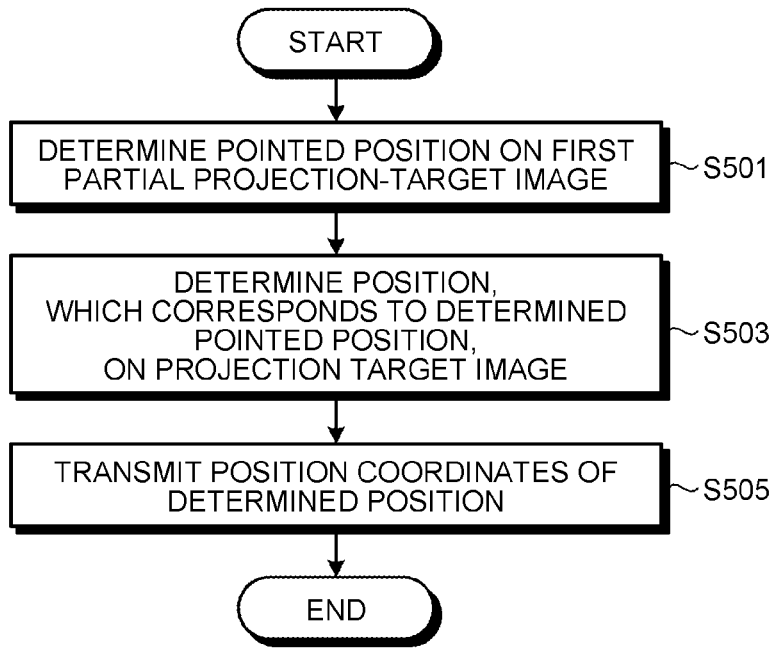
FIG. 22 is a flowchart illustrating a detailed example of operation at Steps S405 and S407 of FIG. 21.

FIG. 22 is a flowchart illustrating a detailed example of the operation at Steps S405 and S407 of the process illustrated in FIG. 21 to be performed by the projection apparatus 120-1.

First, upon obtaining the position coordinates of the pointed position on the first captured partial image from the camera-image processing unit 130, the system control unit 135 of the projection apparatus 120-1 reads the first calibration information from the ROM 38 of the projection apparatus 120-1. The system control unit 135 transforms the pointed position (more specifically, position coordinates of the pointed position) on the first captured partial image to a pointed position (more specifically, position coordinates of the pointed position) on the first partial projection-target image 240-1 pointed with the pointing device 150 using the first calibration information, thereby determining the pointed position (more specifically, position coordinates of the pointed position) on the first partial projection-target image 240-1 (Step S501).

Thereafter, the system control unit 135 determines a position (more specifically, position coordinates), which corresponds to the determined pointed position (more specifically, position coordinates of the pointed position) on the first partial projection-target image 240-1, on the projection target image (Step S503).

Figure 23:
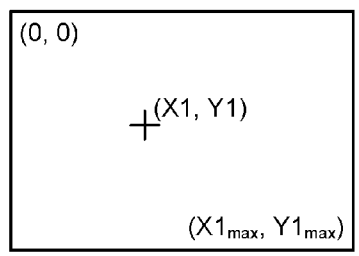
FIG. 23 is an explanatory diagram of an example of coordinates of a first partial projection-target image.
Figure 24:
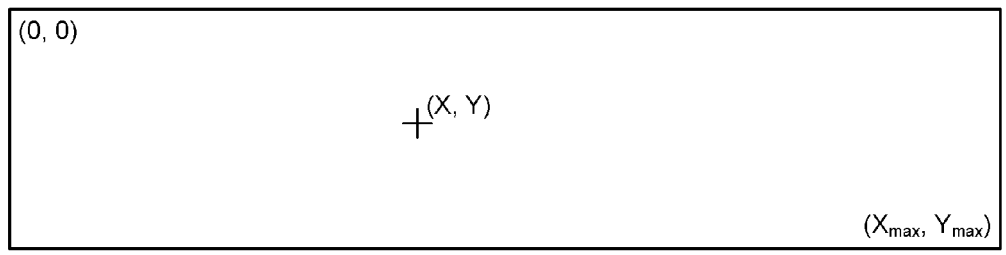
FIG. 24 is an explanatory diagram of an example of coordinates of a projection target image.

Assume that, as illustrated in FIG. 23, top-left coordinates (origin point) on the first partial projection-target image 240-1 are designated as (0,0), bottom-right coordinates as $(X1_{max}, Y1_{max})$, and the position coordinates of the pointed position as (X1,Y1). As illustrated in FIG. 24, top-left coordinates (origin point) on the projection target image are designated as (0,0), bottom-right coordinates as $(X_{max}, Y_{max})$. In this case, position coordinates (X,Y) of the position, which corresponds to the pointed position on the first partial projection-target image 240-1, on the projection target image can be obtained using Expressions (5).

$$X=X1/\alpha, Y=Y1/\alpha \quad (5)$$

As described above, α is the ratio based on the resolution of the extracted first partial projection-target image 240-1 and the resolution of the projection apparatus 20-1 and represents the ratio between the extracted first partial projection-target image 240-1 and the projected first partial projection-target image 240-1. If the resolution of the extracted first partial projection-target image 240-1 and the resolution of the projection apparatus 20-1 are equal to each other, α=1 holds.

Thereafter, the system control unit 135 transmits the position coordinates of the position, which corresponds to the pointed position on the first partial projection-target image 240-1, on the projection target image to the information processing apparatus 110 via the communication control unit 36 (Step S505).

FIG. 25 is a flowchart illustrating a detailed example of the operation at Steps S405 and S407 of the process illustrated in FIG. 21 to be performed by the projection apparatus 120-2.

First, upon obtaining the position coordinates of the pointed position on the second captured partial image from the camera-image processing unit 130, the system control unit 135 of the projection apparatus 120-2 reads the second calibration information from the ROM 38 of the projection apparatus 120-2. The system control unit 135 transforms the pointed position (more specifically, position coordinates of the pointed position) on the second captured partial image to a pointed position (more specifically, position coordinates of the pointed position) on the second partial projection-target image 240-2 pointed with the pointing device 150 using the second calibration information, thereby determining the pointed position (more specifically, position coordinates of the pointed position) on the second partial projection-target image 240-2 (Step S511).

Thereafter, the system control unit 135 determines a position (more specifically, position coordinates), which corresponds to the determined pointed position (more specifically, position coordinates of the pointed position) on the second partial projection-target image 240-2, on the projection target image using the image length information determined by the projection apparatus 20-1 (Step S513). The image length information determined by the projection apparatus 20-1 is fed to the projection apparatus 20-2 via the information processing apparatus 110.

Assume that, as illustrated in FIG. 26, top-left coordinates (origin point) of the second partial projection-target image 240-2 are designated as (0,0), bottom-right coordinates as $(X2_{max}, Y2_{max})$, the position coordinates of the pointed position as (X2,Y2). In this case, position coordinates (X,Y) of the position, which corresponds to the pointed position on the second partial projection-target image 240-2, on the projection target image can be obtained using Expressions (6).

$$X=X2/\beta+(L11-L41), Y=Y2/\beta \quad (6)$$

As described above, β is the ratio based on the resolution of the extracted second partial projection-target image 240-2 and the resolution of the projection apparatus 20-2 and represents the ratio between the extracted second partial projection-target image 240-2 and the projected second partial projection-target image 240-2. If the resolution of the extracted second partial projection-target image 240-2 and the resolution of the projection apparatus 20-2 are equal to each other, p=1 holds.

The origin point (0, 0) on the second partial projection-target image 240-2 is at a position shifted (L11−L41) in the X-axis direction from the origin point (0, 0) on the projection target image (FIG. 15). For this reason, (L11−L41) is added to the X-coordinate.

If the obtained value of the X-coordinate is larger than L41 (Yes at Step S515), the system control unit 135 transmits the position coordinates of the position, which corresponds to the pointed position on the second partial projection-target image 240-2, on the projection target image to the information processing apparatus 110 via the communication control unit 36 (Step S517).

On the other hand, if the obtained value of the X-coordinate is equal to or smaller than L41 (No at Step S515), the system control unit 135 does not transmit the position coordinates of the position, which corresponds to the pointed position on the second partial projection-target image 240-2, on the projection target image to the information processing apparatus 110 via the communication control unit 36. The reason for this operation is as follows. If the obtained value of the X-coordinate is equal to or smaller than L41, it is likely that the pointed position is in an overlapping area between the first partial projection-target image 240-1 and the second partial projection-target image 240-2. In this case, the position coordinates of the position, which corresponds only to the pointed position on the first partial projection-target image 240-1, on the projection target image are transmitted to the projection apparatus 120-1.

Figure 27:
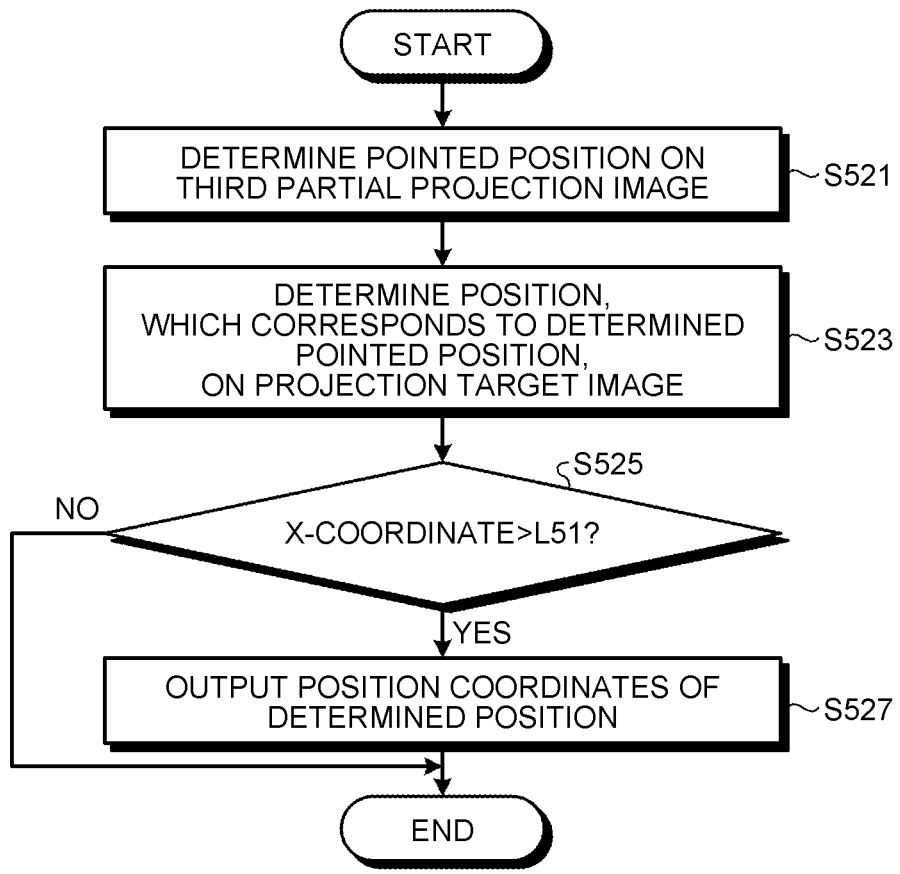
FIG. 27 is a flowchart illustrating a detailed example of the operation at Steps S405 and S407 of FIG. 21.

FIG. 27 is a flowchart illustrating a detailed example of the operation at Steps S405 and S407 of the process illustrated in FIG. 21 to be performed by the projection apparatus 120-3.

First, upon obtaining the position coordinates of the pointed position on the third captured partial image from the camera-image processing unit 130, the system control unit 135 of the projection apparatus 120-3 reads the third calibration information from the ROM 38 of the projection apparatus 120-2. The system control unit 135 transforms the pointed position (more specifically, position coordinates of the pointed position) on the third captured partial image to a pointed position (more specifically, position coordinates of the pointed position) on the third partial projection-target image 240-3 pointed with the pointing device 150 using the third calibration information, thereby determining the pointed position (more specifically, position coordinates of the pointed position) on the third partial projection-target image 240-3 (Step S521).

Thereafter, the system control unit 135 determines a position (more specifically, position coordinates), which corresponds to the determined pointed position (more specifically, position coordinates of the pointed position) on the third partial projection-target image 240-3, on the projection target image using the image length information determined by the projection apparatus 20-1 and the image length information determined by the projection apparatus 20-2 (Step S523). The image length information determined by the projection apparatus 20-1 and the image length information determined by the projection apparatus 20-2 are fed to the projection apparatus 20-3 via the information processing apparatus 110.

Figure 28:
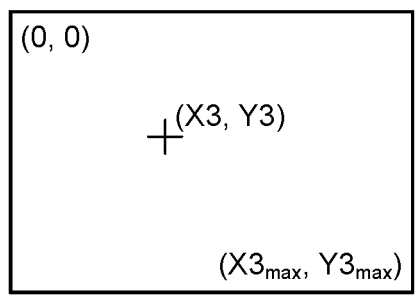
FIG. 28 is an explanatory diagram of an example of coordinates of a third partial projection-target image.

As illustrated in FIG. 28, top-left coordinates (origin point) of the third partial projection-target image 240-3 are designated as (0, 0), bottom-right coordinates as (X3$_{max}$, Y3$_{max}$), the position coordinates of the pointed position as (X3,Y3). In this case, position coordinates (X,Y) of the position, which corresponds to the pointed position on the third partial projection-target image 240-3, on the projection target image can be obtained using Expressions (7).

$$X=X3/\gamma+(L11-L41+L21-L51), Y=Y3/\gamma \qquad (7)$$

As described above, γ is the ratio based on the resolution of the extracted third partial projection-target image 240-3 and the resolution of the projection apparatus 20-3 and represents the ratio between the extracted third partial projection-target image 240-3 and the projected third partial projection-target image 240-3. If the resolution of the extracted third partial projection-target image 240-3 and the resolution of the projection apparatus 20-3 are equal to each other, γ=1 holds.

The origin point (0, 0) on the third partial projection-target image 240-3 is at a position shifted (L11−L41+L21−L51) in the X-axis direction from the origin point (0, 0) on the projection target image (FIG. 15). For this reason, (L11−L41+L21−L51) is added to the X-coordinate.

If the obtained value of the X-coordinate is larger than L51 (Yes at Step S525), the system control unit 135 transmits the position coordinates of the position, which corresponds to the pointed position on the third partial projection-target image 240-3, on the projection target image to the information processing apparatus 110 via the communication control unit 36 (Step S527).

On the other hand, if the obtained value of the X-coordinate is equal to or smaller than L51 (No at Step S525), the system control unit 135 does not transmit the position coordinates of the position, which corresponds to the pointed position on the third partial projection-target image 240-3, on the projection target image to the information processing apparatus 110 via the communication control unit 36. The reason for this operation is as follows. If the obtained value of the X-coordinate is equal to or smaller than L51, it is likely that the pointed position is in an overlapping area between the second partial projection-target image 240-2 and the third partial projection-target image 240-3. In this case, the position coordinates of the position, which corresponds only to the pointed position on the second partial projection-target image 240-2, on the projection target image are transmitted to the projection apparatus 120-2.

Upon receiving the position coordinates from the projection apparatuses 120 in the pointed-position determining process, the control part 116 of the information processing apparatus 110 superimposes a predetermined image at the notified (transmitted) position (more specifically, the position indicated by the position coordinates) on the projection target image. Examples of the predetermined image include a pointer and a graphics object such as a circle and/or a line segment.

Thereafter, when a video signal representing the projection target image on which the predetermined image is superimposed is output from the information processing apparatus 110, each of the projection apparatuses 120 extracts a partial projection-target image using the extraction information of the projection apparatus 20 from the projection target image, applies keystone correction, and projects the keystone-corrected partial projection-target image as in the first embodiment.

For instance, in a situation where the notified position coordinates on the projection target image are to be used in operating the pointing device 150, the control part 116 may superimpose a pointer image at the notified position on the projection target image. Each of the projection apparatuses 120 extracts a partial projection-target image from the projection target image on which the pointer image is superimposed, applies keystone correction, and projects the keystone-corrected partial projection-target image. As a result, the pointer is displayed on the projected multiple partial projection-target images in a manner to track the pointed position pointed with the pointing device 150.

For another instance, in a situation where the notified position coordinates on the projection target image are to be used in drawing application software, the control part 116 may superimpose a graphics object image at the notified position on the projection target image. Each of the projection apparatuses 120 extracts a partial projection-target image from the projection target image on which the graphics object image is superimposed, applies keystone correction, and projects the keystone-corrected partial projection-target image. As a result, the graphics image is displayed on the projected multiple partial projection-target images in accordance with the pointed position pointed with the pointing device 150.

As described above, according to the second embodiment, even when multiple projection is implemented using the technique according to the first embodiment, interactive operation can be implemented.

Modifications

The invention should not be viewed as limited to the disclosed embodiments and can be modified in various manners.

First Modification

Although keystone correction is applied according to each of the first and second embodiments, keystone correction may be skipped. More specifically, if the projection apparatuses are oriented exactly toward the projection medium and equidistant from the projection medium, keystone correction may be skipped.

Second Modification

Although the projection system according to each of the first and second embodiments includes the information processing apparatus, the information processing apparatus may be omitted. More specifically, if any one of projection apparatuses provides functions of the information processing apparatus, the information processing apparatus may be omitted. In this case, a projection target image may preferably be input to the one of the projection apparatuses via an external memory such as a USB (universal serial bus) memory.

Third Modification

The multiple projection apparatuses are laterally aligned to display images in a tiled manner according to each of the first and second embodiments. Alternatively, the multiple projection apparatuses may be vertically aligned to display images in a tiled manner. Further alternatively, the multiple projection apparatuses may be arranged on a matrix (aligned in both the horizontal and vertical directions) to display images in a tiled manner.

When the multiple projection apparatuses are vertically aligned, it may be preferable that projection areas are arranged to vertically overlap each other; vertical lengths of individual pattern images are calculated. When the multiple projection apparatuses are arranged in a matrix, it may be preferable that projection areas are arranged to vertically and horizontally overlap each other; vertical lengths and horizontal (lateral) lengths of individual pattern images are calculated.

Fourth Modification

According to each the first and second embodiments, each of the projection apparatuses generates extraction information and extracts a projection target image. Alternatively, generation of the extraction information and extraction of the projection target image may be performed by the information processing apparatus or one of the projection apparatuses which provides the functions of the information processing apparatus.

Fifth Modification

According to the second embodiment, each of the projection apparatuses 120 determines a pointed position. Alternatively, the information processing apparatus 110 or one of the projection apparatuses 120 which provides the functions of the information processing apparatus 110 may determine the pointed position.

When the pointed position is to be determined by the information processing apparatus 110, determination of the pointed position may preferably be performed as follows, for example. In the calibration process (FIG. 19), each of the projection apparatuses 120 transmits calibration information, together with notification of completion of the calibration process, to the information processing apparatus 110. The information processing apparatus 110 stores the calibration information in the storage unit 15 in a manner that allows distinguishing which one of the projection apparatuses 120 the calibration information is about.

In the pointed-position determining process (FIG. 21), each of the projection apparatuses 120 transmits position coordinates of a pointed position on a captured partial image rather than position coordinates of a position, which corresponds to the pointed position on the captured partial image, on a projection target image to the information processing apparatus 110.

Upon receiving the position coordinates of the pointed position on the first captured partial image from the projection apparatus 120-1, the information processing apparatus 110 performs the process described above with reference to FIG. 22 (excluding the operation at Step S505) using the first calibration information.

Upon receiving the position coordinates of the pointed position on the second captured partial image from the projection apparatus 120-2, the information processing apparatus 110 performs the process described above with reference to FIG. 25 (excluding the operation at Step S517) using the second calibration information. If the determination at Step S515 is No, the determined position coordinates on the projection target image may preferably be discarded.

Upon receiving the position coordinates of the pointed position on the third captured partial image from the projection apparatus 120-3, the information processing apparatus 110 performs the process described above with reference to FIG. 27 (excluding the operation at Step S527) using the third calibration information. If the determination at Step S525 is No, the determined position coordinates on the projection target image may preferably be discarded.

Program instructions to be executed by the information processing apparatus and the projection apparatuses according to each of the first and second embodiments may be provided as being stored in a non-transitory tangible computer-readable storage medium, such as a CD-ROM, a CD-R, a memory card, a DVD, or a flexible disk (FD), as a file in an installable or executable format.

The program instructions to be executed by the information processing apparatus and the projection apparatuses according to each of the first and second embodiments may be configured to be stored in a computer connected to a network such as the Internet and provided by being downloaded over the network. The program instructions to be executed by the information processing apparatus and the projection apparatuses according to each of the first and second embodiments may be configured to be provided or distributed over a network such as the Internet. The program instructions to be executed by the information processing apparatus and the projection apparatuses according to each of the first and second embodiments may be configured to be provided as being stored in a ROM or the like in advance.

The program instructions to be executed by the information processing apparatus and the projection apparatuses according to each of the first and second embodiments are configured in modules for implementing the units described above on a computer. From the viewpoint of actual hardware, a CPU reads out the program instructions from the ROM, loads them on the RAM, and executes the program instructions, thereby implementing the units on the computer.

According to an aspect of the present invention, cost and constraint on arrangement can be advantageously reduced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A projection system including multiple projection apparatuses, the projection system comprising:
 a first projection unit configured to project a first pattern image on a first projection area;
 a second projection unit configured to project a second pattern image on a second projection area, the second projection area partially overlapping the first projection area; and a first image capturing unit configured to, when the first pattern image is projected on the first projection area, perform first image capture to obtain a first captured image by capturing an image capture area including the first projection area and at least a portion of a second projection area and, when the second pattern image is projected on the second projection area, perform second image capture to obtain a second captured image by capturing the image capture area, wherein the first projection unit is configured to project a first partial projection-target image extracted from a projection target image based on the first captured image, the second captured image, and the projection target image on the first projection area, and wherein the second projection unit is configured to project a second partial projection-target image extracted from the projection target image based on the first captured image, the second captured image, and the projection target image on the second projection area, an image-length-information determining unit configured to determine image length information including lateral length of the first pattern image, length of the second pattern image, and lateral length of an overlapping portion between the first pattern image and the second pattern image using the first captured image and the second captured image;

a first generation unit configured to generate first extraction information, the first extraction information specifying an extraction position at which the first partial projection-target image is to be extracted from the projection target image, based on the image length information and lateral length of the projection target image;

a first extraction unit configured to extract the first partial projection-target image from the projection target image using the first extraction information;

a second generation unit configured to generate second extraction information, the second extraction information specifying an extraction position at which the second partial projection-target image is to be extracted from the projection target image, based on the image length information and the lateral length of the projection target image; and a second extraction unit configured to extract the second partial projection-target image from the projection target image using the second extraction information.

2. The projection system according to claim 1,
wherein the first extraction information indicates the first extraction start position and a first extraction length for extracting the first partial projection-target image from the projection target image, and
the second extraction information indicates the second extraction start position and a second extraction length for extracting the second partial projection-target image from the projection target image.

3. The projection system according to claim 1, further comprising a calculation unit configured to calculate a lateral length of an entire projection area using the image length information,
wherein the first generation unit is configured to generate the first extraction information using the image length information, the lateral length of the entire projection area, and the lateral length of the projection target image, and
the second generation unit is configured to generate the second extraction information using the image length information, the lateral length of the entire projection area, and the lateral length of the projection target image.

4. The projection system according to claim 1, wherein the image-length-information determining unit is configured to determine the lateral length of the second pattern image using the lateral length of the first pattern image and a ratio between the lateral length of the first pattern image and the lateral length of the second pattern image.

5. The projection system according to claim 4,
wherein the first pattern image and the second pattern image are images of a same check pattern, and
the image-length-information determining unit is configured to determine a unit length in lateral direction of the check pattern of the first pattern image based on the first captured image, a unit length in lateral direction of the check pattern of the second pattern image based on the second captured image, and is configured to determine the ratio based on the unit length in lateral direction of the check pattern of the first pattern image and the unit length in lateral direction of the check pattern of the second pattern image.

6. The projection system according to claim 1, further comprising an image-capture-distortion correcting unit configured to apply image-capture-distortion correction to the first captured image and the second captured image.

7. The projection system according to claim 6, further comprising:
a second image capturing unit;
a second detection unit;
a second position determining unit; and
a superimposing unit,
wherein the second image capturing unit is configured to perform image capture of the second partial projection-target image projected on the second projection area,
if a pointed position is pointed on the projected second partial projection-target image, the second detection unit is configured to detect the pointed position on the captured second partial projection-target image,
the second position determining unit is configured to determine a position, the position corresponding to the detected pointed position, on the projection target image,
the superimposing unit is configured to superimpose an image at the determined position on the projection target image, and
the second projection unit is configured to project the second partial projection-target image, on which the image is superimposed, extracted from the projection target image on the second projection area.

8. The projection system according to claim 7, further comprising a second calibration unit,
wherein the second projection unit is configured to project a second calibration image on the second projection area,
the second image capturing unit is configured to perform image capture of the second calibration image projected on the second projection area,
the second calibration unit is configured to calculate second calibration information about correspondence between the second calibration image and the captured second calibration image, and
the second position determining unit is configured to determine the pointed position on the second partial projection-target image using the second calibration information and is configured to determine the position on the projection target image using the image length information based on the pointed position.

9. The projection system according to claim 1, further comprising:
a second image capturing unit;
a second detection unit;
a second position determining unit; and
a superimposing unit,
wherein the second image capturing unit is configured to perform image capture of the second partial projection-target image projected on the second projection area,
if a pointed position is pointed on the projected second partial projection-target image, the second detection unit is configured to detect the pointed position on the captured second partial projection-target image,
the second position determining unit is configured to determine a position, the position corresponding to the detected pointed position, on the projection target image,
the superimposing unit is configured to superimpose an image at the determined position on the projection target image, and
the second projection unit is configured to project the second partial projection-target image, on which the image is superimposed, extracted from the projection target image on the second projection area.

10. The projection system according to claim 9, further comprising a second calibration unit,
wherein the second projection unit is configured to project a second calibration image on the second projection area,
the second image capturing unit is configured to perform image capture of the second calibration image projected on the second projection area,
the second calibration unit is configured to calculate second calibration information about correspondence between the second calibration image and the captured second calibration image, and
the second position determining unit is configured to determine the pointed position on the second partial projection-target image using the second calibration information and is configured to determine the position on the projection target image using the image length information based on the pointed position.

11. The projection system according to claim 1, further comprising an information processing apparatus.

12. A projection system including multiple projection apparatuses, the projection system comprising:
a first projection unit configured to project a first pattern image on a first projection area;
a second projection unit configured to project a second pattern image on a second projection area, the second projection area partially overlapping the first projection area;
a first image capturing unit configured to, when the first pattern image is projected on the first projection area, perform first image capture to obtain a first captured image by capturing an image capture area including the first projection area and at least a portion of a second projection area and, when the second pattern image is projected on the second projection area, perform second image capture to obtain a second captured image by capturing the image capture area,
wherein the first projection unit is configured to project a first partial projection-target image extracted from a projection target image based on the first captured image, the second captured image, and the projection target image on the first projection area, and wherein the second projection unit is configured to project a second partial projection-target image extracted from the projection target image based on the first captured image, the second captured image, and the projection target image on the second projection area;
a first detection unit;
a first position determining unit; and
a superimposing unit,
wherein the first image capturing unit is configured to perform image capture of the first partial projection-target image projected on the first projection area,
if a pointed position is pointed on the projected first partial projection-target image, the first detection unit is configured to detect the pointed position on a captured first partial image, the captured first partial image being the captured first partial projection-target image,
the first position determining unit is configured to determine a position, the position corresponding to the detected pointed position, on the projection target image,
the superimposing unit is configured to superimpose an image at the determined position on the projection target image, and
the first projection unit is configured to project the first partial projection-target image, on which the image is superimposed, extracted from the projection target image on the first projection area.

13. The projection system according to claim 12, further comprising a first calibration unit,
wherein the first projection unit is configured to project a first calibration image on the first projection area,
the first image capturing unit is configured to perform image capture of the first calibration image projected on the first projection area,
the first calibration unit is configured to calculate first calibration information about correspondence between the first calibration image and the captured first calibration image, and
the first position determining unit is configured to determine the pointed position on the first partial projection-target image using the first calibration information and is configured to determine the position on the projection target image based on the pointed position.

14. A projection system including multiple projection apparatuses, the projection system comprising:
a first projection unit configured to project a first pattern image on a first projection area;
a second projection unit configured to project a second pattern image on a second projection area, the second projection area partially overlapping the first projection area; and
a first image capturing unit configured to, when the first pattern image is projected on the first projection area, perform first image capture to obtain a first captured image by capturing an image capture area including the first projection area and at least a portion of a second projection area and, when the second pattern image is projected on the second projection area, perform second image capture to obtain a second captured image by capturing the image capture area,
wherein the first projection unit is configured to project a first partial projection-target image extracted from a projection target image based on the first captured image, the second captured image, and the projection target image on the first projection area, and wherein the second projection unit is configured to project a second partial projection-target image extracted from the projection target image based on the first captured image, the second captured image, and the projection target image on the second projection area;
a first projection-distortion correcting unit configured to apply projection distortion correction to the first pattern image so that the first pattern image is projected on the first projection area;
a second projection-distortion correcting unit configured to apply projection distortion correction to the second pattern image so that the second pattern image is projected on the second projection area;
a second image capturing unit;
a second detection unit;
a second position determining unit; and
a superimposing unit,
wherein the second image capturing unit is configured to perform image capture of the second partial projection-target image projected on the second projection area,
if a pointed position is pointed on the projected second partial projection-target image, the second detection unit is configured to detect the pointed position on the captured second partial projection-target image,
the second position determining unit is configured to determine a position, the position corresponding to the detected pointed position, on the projection target image,
the superimposing unit is configured to superimpose an image at the determined position on the projection target image, and
the second projection unit is configured to project the second partial projection-target image, on which the image is superimposed, extracted from the projection target image on the second projection area.

15. The projection system according to claim 14, further comprising a second calibration unit,
wherein the second projection unit is configured to project a second calibration image on the second projection area,
the second image capturing unit is configured to perform image capture of the second calibration image projected on the second projection area,
the second calibration unit is configured to calculate second calibration information about correspondence between the second calibration image and the captured second calibration image, and
the second position determining unit is configured to determine the pointed position on the second partial projection-target image using the second calibration information and is configured to determine the position on the projection target image using the image length information based on the pointed position.

16. A projection method comprising:
projecting a first pattern image on a first projection area;
performing, when the first pattern image is projected on the first projection area, first image capture to obtain a first captured image by capturing an image capture area including the first projection area and at least a portion of a second projection area, the second projection area partially overlapping the first projection area;
projecting a second pattern image on the second projection area;
performing, when the second pattern image is projected on the second projection area, second image capture to obtain a second captured image by capturing the image capture area;
projecting a first partial projection-target image extracted from a projection target image based on the first captured image and the second captured image on the first projection area;
projecting a second partial projection-target image extracted from the projection target image based on the first captured image and the second captured image on the second projection area;
determining image length information including lateral length of the first pattern image, length of the second pattern image, and lateral length of an overlapping portion between the first pattern image and the second pattern image using the first captured image and the second captured image;
generating first extraction information, the first extraction information specifying an extraction position at which the first partial projection-target image is to be extracted from the projection target image, based on the image length information and lateral length of the projection target image;
extracting the first partial projection-target image from the projection target image using the first extraction information;
generating second extraction information, the second extraction information specifying an extraction position at which the second partial projection-target image is to be extracted from the projection target image, based on the image length information and the lateral length of the projection target image; and
extracting the second partial projection-target image from the projection target image using the second extraction information.

17. A method for a projection system including multiple projection apparatuses, the method comprising:
projecting a first pattern image on a first projection area;
projecting a second pattern image on a second projection area, the second projection area partially overlapping the first projection area;
performing, when the first pattern image is projected on the first projection area, first image capture to obtain a first captured image by capturing an image capture area including the first projection area and at least a portion of a second projection area;
performing when the second pattern image is projected on the second projection area, second image capture to obtain a second captured image by capturing the image capture area;
projecting a first partial projection-target image extracted from a projection target image based on the first captured image, the second captured image, and the projection target image on the first projection area,
projecting a second partial projection-target image extracted from the projection target image based on the first captured image, the second captured image, and the projection target image on the second projection area;
performing image capture of the first partial projection-target image projected on the first projection area;
detecting, if a pointed position is pointed on the projected first partial projection-target image, the pointed position on a captured first partial image, the captured first partial image being the captured first partial projection-target image;
determining a position, the position corresponding to the detected pointed position, on the projection target image;

superimposing an image at the determined position on the projection target image; and projecting the first partial projection-target image, on which the image is superimposed, extracted from the projection target image on the first projection area.

* * * * *